(12) United States Patent
Jeon et al.

(10) Patent No.: US 12,456,583 B2
(45) Date of Patent: Oct. 28, 2025

(54) CERAMIC ELECTRONIC COMPONENT AND METHOD OF MANUFACTURING THE SAME

(71) Applicant: SAMSUNG ELECTRO-MECHANICS CO., LTD., Suwon-si (KR)

(72) Inventors: In Ho Jeon, Suwon-si (KR); Seok Hyun Yoon, Suwon-si (KR); Jin Woo Kim, Suwon-si (KR); Byung Kil Yun, Suwon-si (KR); Bon Hyeong Koo, Suwon-si (KR); Min Jung Jang, Suwon-si (KR); Mi Yang Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 138 days.

(21) Appl. No.: 18/242,833

(22) Filed: Sep. 6, 2023

(65) Prior Publication Data

US 2024/0153705 A1    May 9, 2024

(30) Foreign Application Priority Data

Dec. 28, 2022  (KR) .................. 10-2022-0187735

(51) Int. Cl.
   *H01G 4/12*      (2006.01)
   *H01G 4/008*    (2006.01)
   (Continued)

(52) U.S. Cl.
   CPC ......... *H01G 4/1227* (2013.01); *H01G 4/0085* (2013.01); *H01G 4/012* (2013.01); *H01G 4/30* (2013.01)

(58) Field of Classification Search
   CPC .... H01G 4/1227; H01G 4/0085; H01G 4/012; H01G 4/30
   See application file for complete search history.

(56) References Cited

U.S. PATENT DOCUMENTS

2016/0276102 A1   9/2016   Suzuki et al.
2016/0358713 A1   12/2016  Doi et al.
(Continued)

FOREIGN PATENT DOCUMENTS

| KR | 10-2016-0085296 A | 7/2016 |
|----|-------------------|--------|
| KR | 10-2016-0143517 A | 12/2016 |
| KR | 10-2137395 B1     | 7/2020 |

OTHER PUBLICATIONS

European search report dated Apr. 16, 2024 issued in corresponding European Patent Application No. 23196230.9.
(Continued)

*Primary Examiner* — Michael P McFadden
(74) *Attorney, Agent, or Firm* — Morgan, Lewis & Bockius LLP

(57) ABSTRACT

A ceramic electronic component includes a body including a dielectric layer and an internal electrode disposed alternately with the dielectric layer; and an external electrode disposed on the body, wherein the dielectric layer includes a first region extending from an interfacial surface with the internal electrode to 50 nm of the dielectric layer in an inward direction and a second region excluding the first region, and wherein, in the first region, an average content of In based on overall elements excluding oxygen is 0.5 at % or more and 2.0 at % or less, and an average content of Sn based on overall elements excluding oxygen is 0.5 at % or more and 1.75 at % or less.

14 Claims, 9 Drawing Sheets

(51) Int. Cl.
H01G 4/012 (2006.01)
H01G 4/30 (2006.01)

(56) References Cited

U.S. PATENT DOCUMENTS

| | | | |
|---|---|---|---|
| 2018/0265413 A1* | 9/2018 | Okamoto | H01G 4/30 |
| 2018/0294099 A1* | 10/2018 | Makino | H01G 4/232 |
| 2018/0308636 A1* | 10/2018 | de Rochemont | H10D 1/682 |
| 2019/0057813 A1 | 2/2019 | Okamoto | |
| 2019/0241476 A1 | 8/2019 | Nomura et al. | |
| 2019/0279817 A1* | 9/2019 | Park | H01G 4/1263 |
| 2021/0188713 A1* | 6/2021 | Lee | C04B 35/475 |
| 2021/0202177 A1 | 7/2021 | Kurosu et al. | |
| 2022/0157523 A1 | 5/2022 | Lee et al. | |

OTHER PUBLICATIONS

Suzuki et al., Suppressive effect of Ni-Sn internal electrode at the anode on the leakage current degradation of BaTiO3-based multilayer ceramic capacitors, Applied Physics Letters 118, 112904 (2021).

* cited by examiner

CERAMIC ELECTRONIC COMPONENT AND METHOD OF MANUFACTURING THE SAME

CROSS-REFERENCE TO RELATED APPLICATION(S)

This application claims benefit of priority to Korean Patent Application No. 10-2022-0187735 filed on Dec. 28, 2022 and Korean Patent Application No. 10-2022-0146266 filed on Nov. 4, 2022 in the Korean Intellectual Property Office, the disclosures of which are incorporated herein by reference in their entirety.

BACKGROUND

1. Technical Field

The present disclosure relates to a ceramic electronic component and a method of manufacturing the same.

2. Description of Related Art

A multilayer ceramic capacitor (MLCC), a ceramic electronic component, may be a chip-type capacitor mounted on a printed circuit board of various electronic products such as an imaging device such as a liquid crystal display (LCD) and a plasma display panel (PDP), a computer, a smartphone and a mobile phone and may be charged or discharged with electricity.

Such a multilayer ceramic capacitor may be used as a component of various electronic devices, allowing for a relatively small size, high capacity, and ease of mounting thereof. As various electronic devices such as computers and mobile devices have been designed to be miniaturized and to have high output, demands for miniaturization and high capacity of a multilayer ceramic capacitor has increased.

Recently, the technology of electric vehicles (EV, HEV, PHEV, etc.) has gradually improved and a penetration rate has increased, and accordingly, demand for semiconductors and electronic passive devices have rapidly increased. Differently from electronic passive devices for IT, devices for electric vehicles may need to operate without errors in a high temperature/high pressure/high humidity environment. Accordingly, it may be necessary to develop materials which may realize ultra-high reliability at a high guaranteed voltage.

SUMMARY

An example embodiment of the present disclosure is to improve a room-temperature dielectric constant of a dielectric layer.

An example embodiment of the present disclosure is to reduce a dissipation factor (DF) of a dielectric layer of a ceramic electronic component.

An example embodiment of the present disclosure is to improve temperature coefficient of capacitance (TCC) of a ceramic electronic component.

An example embodiment of the present disclosure is to improve high-temperature insulation resistance of a ceramic electronic component.

An example embodiment of the present disclosure is to improve a mean-time to failure (MTTF) of a ceramic electronic component.

According to an example embodiment of the present disclosure, a ceramic electronic component includes a body including a dielectric layer and an internal electrode disposed alternately with the dielectric layer; and an external electrode disposed on the body, wherein the dielectric layer includes a first region extending from an interfacial surface between the dielectric layer and the internal electrode to a thickness of 50 nm in the dielectric layer and a second region excluding the first region, and wherein, the first region includes In and Sn, and in the first region, an average content of In based on overall elements excluding oxygen is 0.5 at % or more and 2.0 at % or less, and an average content of Sn based on the overall elements excluding oxygen is 0.5 at % or more and 1.75 at % or less.

According to an example embodiment of the present disclosure, a method of manufacturing a ceramic electronic component includes preparing a dielectric composition including a dielectric powder as a main component, and including 0.9 mol or more and 1.8 mol or less of Sn and 0.05 mol or more and 0.1 mol or less of In based on 100 mol of the main component; forming a ceramic green sheet using the dielectric composition; forming a laminate by printing conductive paste for an internal electrode on the ceramic green sheet and laminating; forming a body including a dielectric layer and an internal electrode by firing the laminate; and forming an external electrode on the body.

According to an example embodiment of the present disclosure, a method of manufacturing a ceramic electronic component includes preparing a dielectric composition including In, Sn, and a dielectric powder as a main component; forming a ceramic green sheet using the dielectric composition; forming a laminate by printing conductive paste for an internal electrode on the ceramic green sheet and laminating; and forming a body including a dielectric layer and an internal electrode by firing the laminate in an atmosphere including hydrogen at a concentration 0.2 vol % to 0.4 vol %.

According to an example embodiment of the present disclosure, a ceramic electronic component includes a body including a dielectric layer and an internal electrode disposed alternately with the dielectric layer; and an external electrode disposed on the body, wherein the dielectric layer comprises In, Sn, and a first subcomponent element including V, wherein the dielectric layer includes a first region extending from an interfacial surface between the dielectric layer and the internal electrode to a thickness of 50 nm in the dielectric layer and a second region excluding the first region, and wherein, in the first region, an average content of In based on overall elements excluding oxygen is 0.5 at % or more and 2.0 at % or less, and an average content of Sn based on the overall elements excluding oxygen is 0.5 at % or more and 1.75 at % or less.

BRIEF DESCRIPTION OF DRAWINGS

The above and other aspects, features, and advantages of the present disclosure will be more clearly understood from the following detailed description, taken in combination with the accompanying drawings, in which.

DETAILED DESCRIPTION

Figure 1:
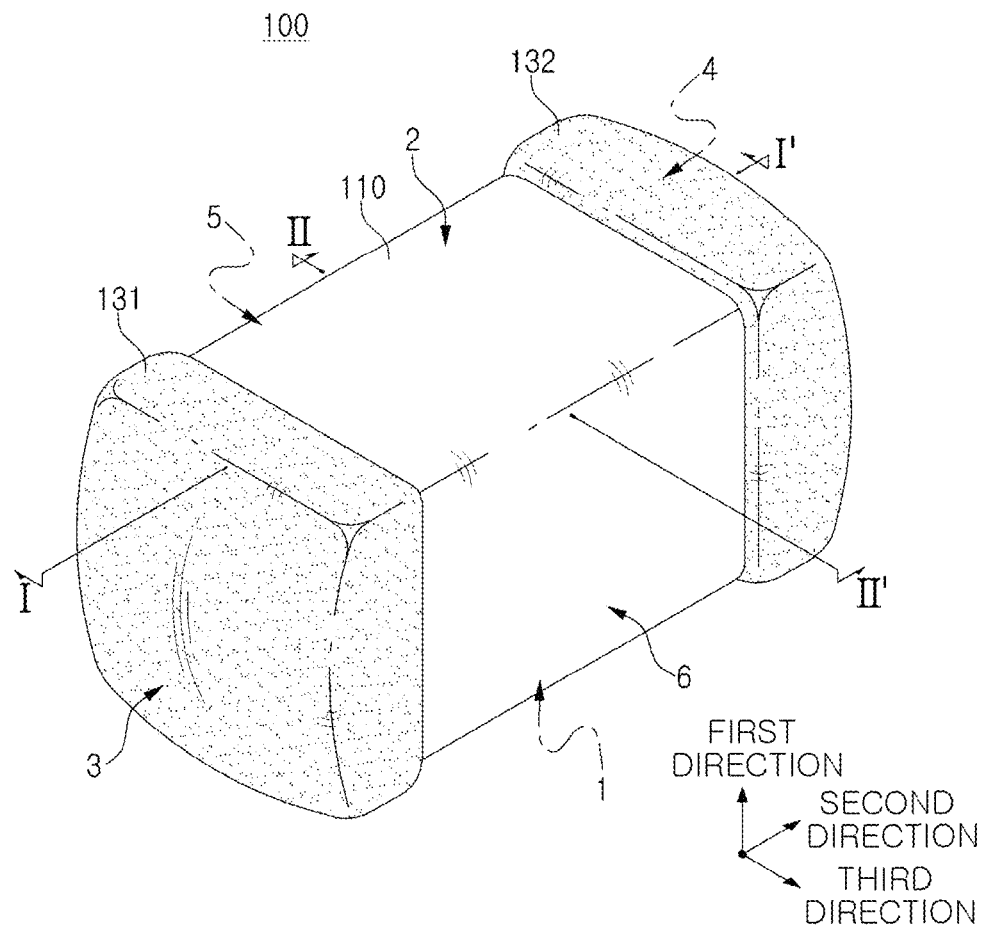
FIG. 1 is a perspective diagram illustrating a ceramic electronic component according to an example embodiment of the present disclosure.

Hereinafter, example embodiments of the present disclosure will be described below with reference to the accompanying drawings.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after a gaining an understanding of the disclosure of this application.

In the drawings, same elements will be indicated by the same reference numerals. Also, redundant descriptions and detailed descriptions of known functions and elements which may unnecessarily render the gist of the present disclosure obscure will not be provided. In the accompanying drawings, some elements may be exaggerated, omitted or briefly illustrated, and the sizes of the elements do not necessarily reflect the actual sizes of these elements. The terms, "include," "comprise," "is configured to," or the like of the description are used to indicate the presence of features, numbers, steps, operations, elements, portions or combination thereof, and do not exclude the possibilities of combination or addition of one or more features, numbers, steps, operations, elements, portions or combination thereof.

In the drawings, a first direction may be defined as a lamination direction or a thickness T direction, a second direction may be defined as a length L direction, and a third direction may be defined as a width W direction.

Ceramic Electronic Component

FIG. 1 is a perspective diagram illustrating a ceramic electronic component according to an example embodiment.

Figure 2:
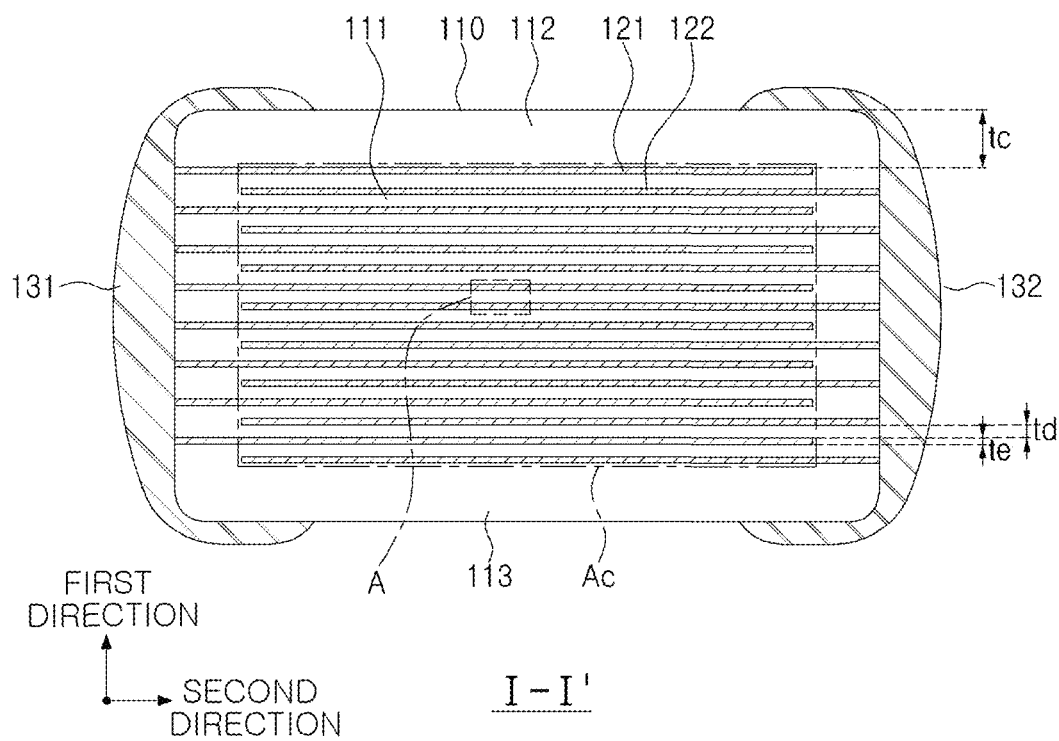
FIG. 2 is a cross-sectional diagram taken along line I-I' in FIG. 1.

FIG. 2 is a cross-sectional diagram taken along line I-I' in FIG. 1.

Figure 3:
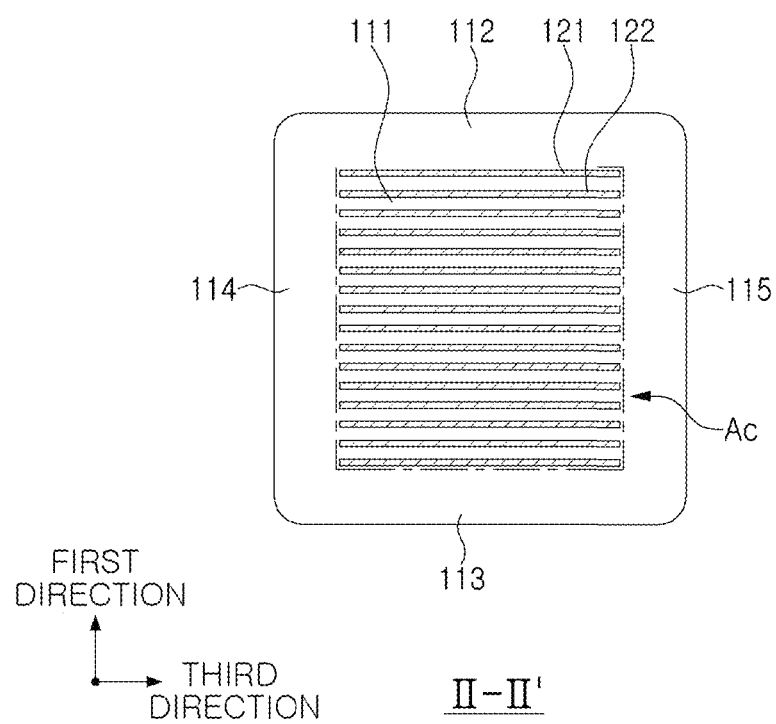
FIG. 3 is a cross-sectional diagram taken along line II-II' in FIG. 1.

FIG. 3 is a cross-sectional diagram taken along line II-II' in FIG. 1.

Figure 4:
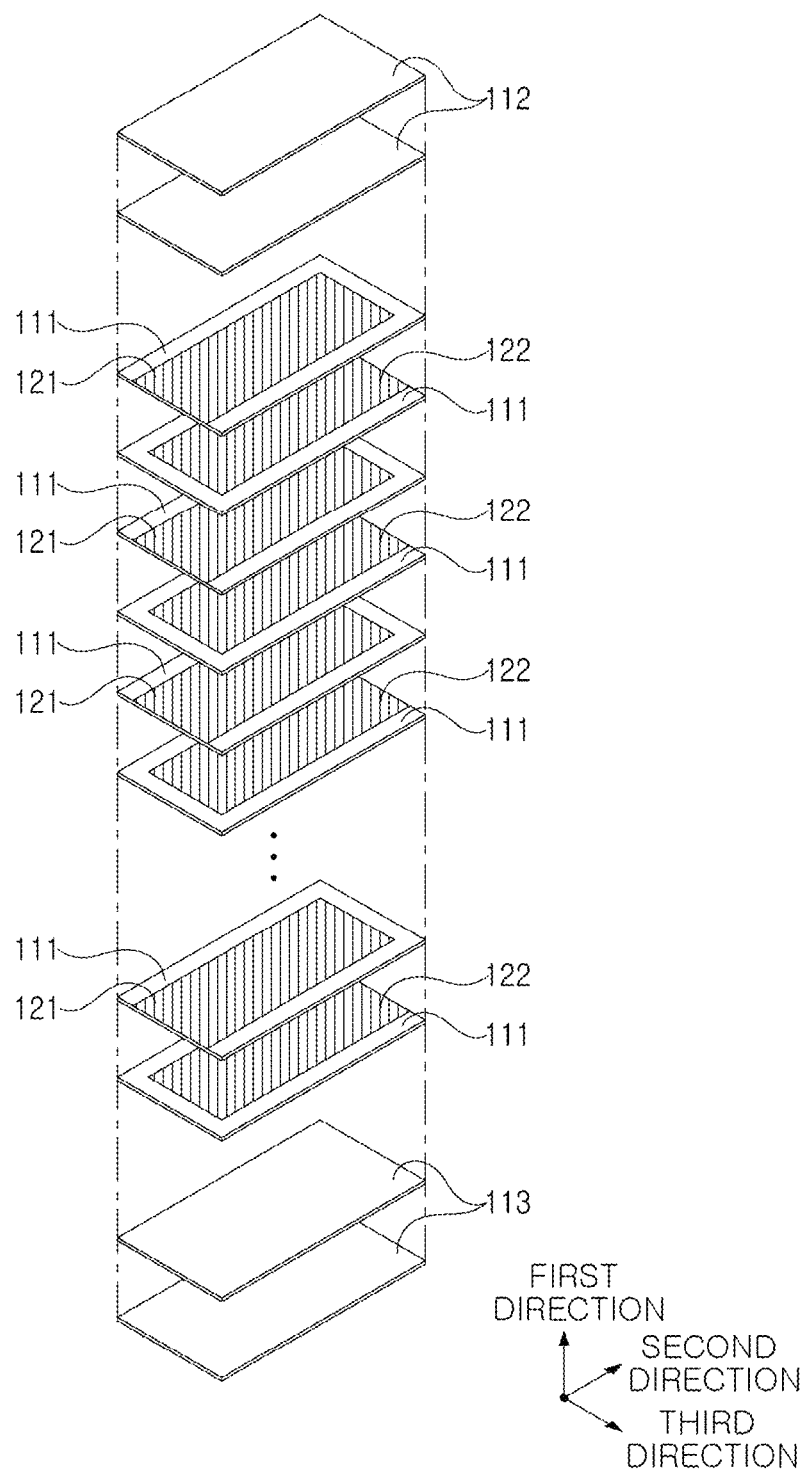
FIG. 4 is an exploded perspective diagram illustrating a body according to an example embodiment of the present disclosure.

FIG. 4 is an exploded perspective diagram illustrating a body according to an example embodiment.

Figure 5:
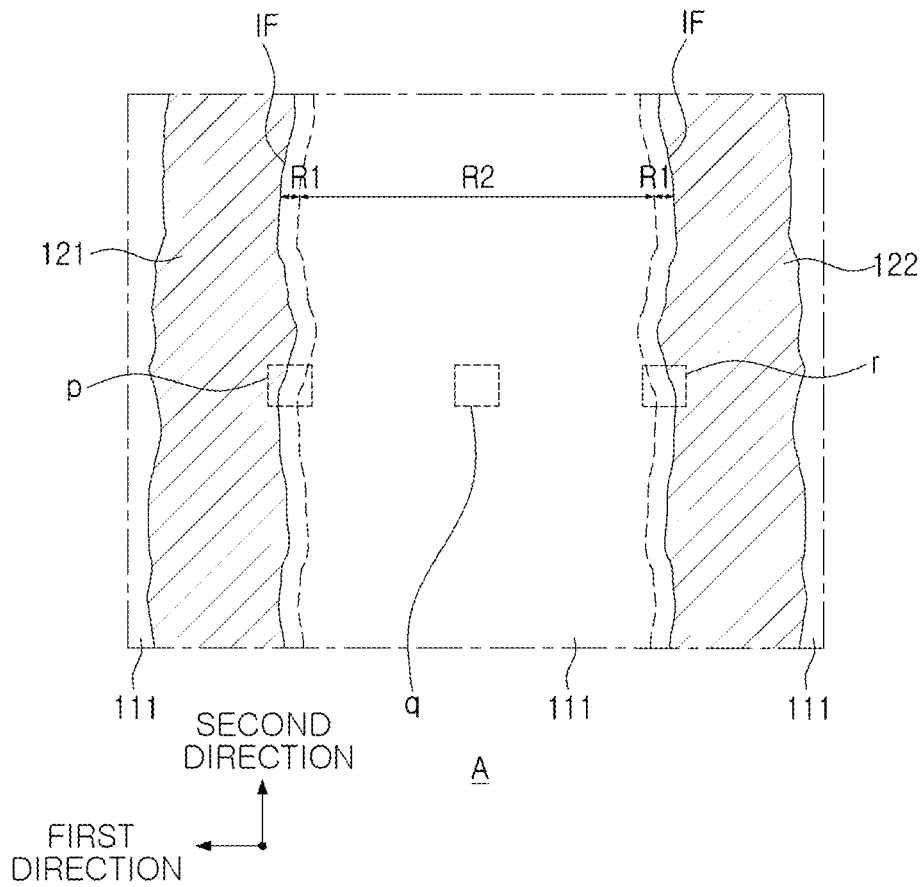
FIG. 5 is an enlarged diagram illustrating region A in FIG. 2.

FIG. 5 is an enlarged diagram illustrating region A in FIG. 2.

Figure 6:
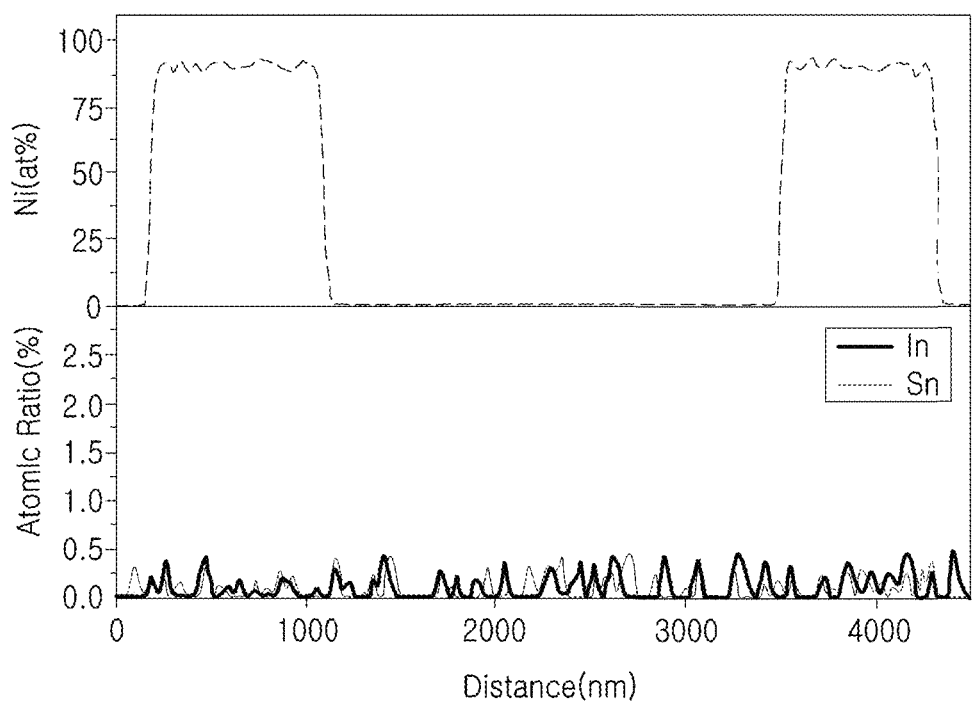
FIG. 6 is a graph illustrating a result of line profile analysis of measuring contents of Ni, In, and Sn elements using STEM-EDS along regions corresponding to p, q, and r regions in FIG. 5 in a ceramic electronic component according to a comparative embodiment of the present disclosure.

FIG. 6 is a graph illustrating a result of line profile analysis of measuring contents of Ni, In, and Sn elements using STEM-EDS along regions corresponding to p, q, and r regions in FIG. 5 in a ceramic electronic component according to a comparative embodiment.

Figure 7:
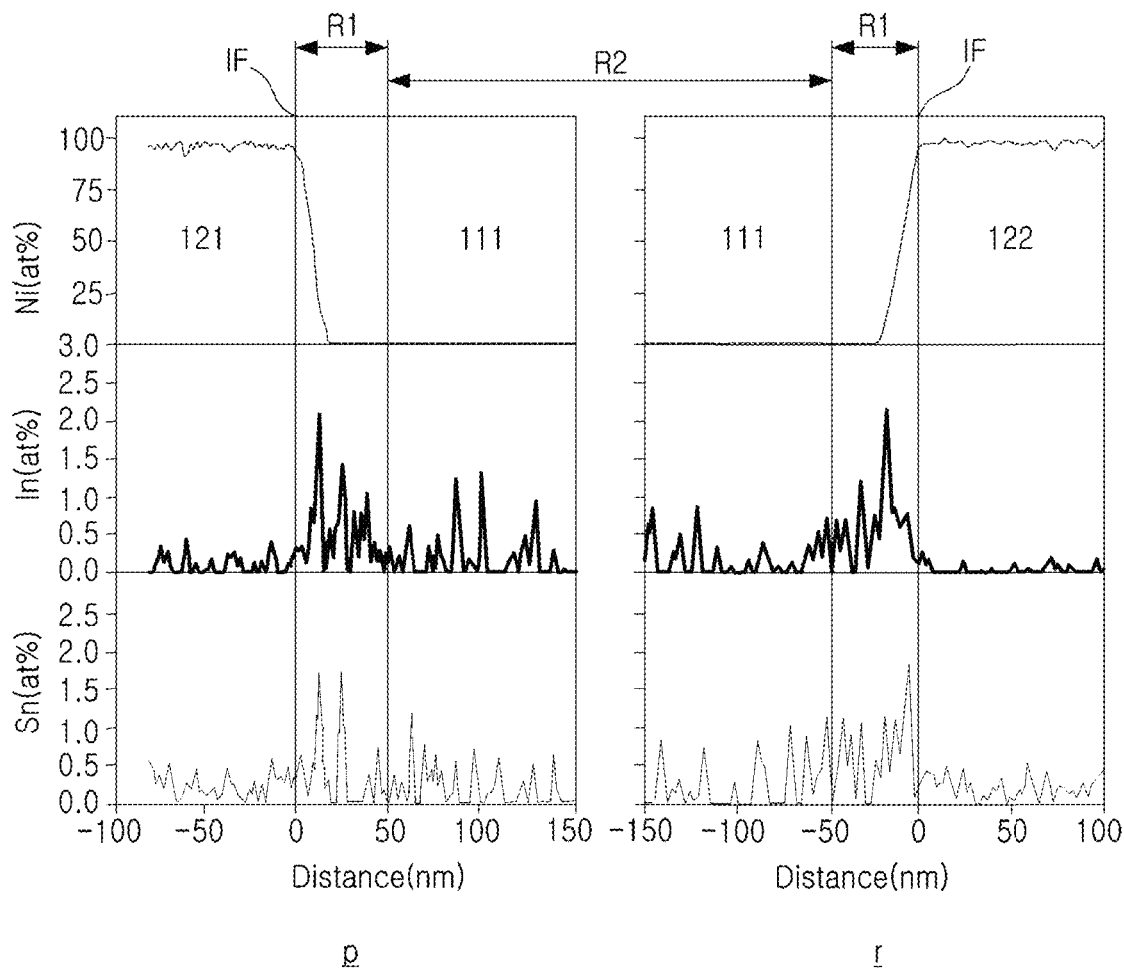
FIG. 7 is a graph illustrating a result of line profile analysis of measuring contents of Ni, In, and Sn elements using STEM-EDS in p and r regions in FIG. 5 in a ceramic electronic component according to an example embodiment of the present disclosure.

FIG. 7 is a graph illustrating a result of line profile analysis of measuring contents of Ni, In, and Sn elements using STEM-EDS in p and r regions in FIG. 5 in a ceramic electronic component according to an example embodiment.

Figure 8:
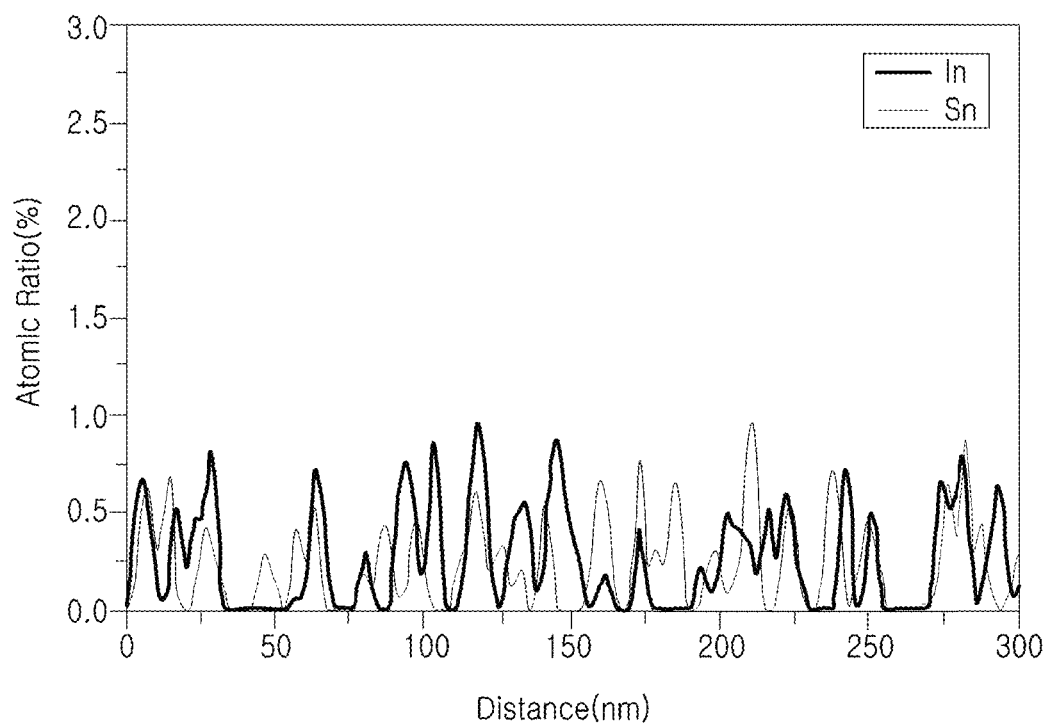
FIG. 8 is a graph illustrating a result of line profile analysis of measuring contents of In and Sn elements using STEM-EDS in region q in FIG. 5 in a ceramic electronic component according to an example embodiment of the present disclosure.

FIG. 8 is a graph illustrating a result of line profile analysis of measuring contents of In and Sn elements using STEM-EDS in region q in FIG. 5 in a ceramic electronic component according to an example embodiment.

Hereinafter, referring to FIGS. 1 to 8, a ceramic electronic component 100 according to an example embodiment will be described in detail. A multilayer ceramic capacitor will be described as an example of a ceramic electronic component, but the example embodiment may also be applied to various electronic products using a dielectric composition, such as an inductor, a piezoelectric element, a varistor, or a thermistor.

The ceramic electronic component 100 in an example embodiment may include a body 110 including a dielectric layer 111 and internal electrodes 121 and 122 disposed alternately with the dielectric layer; and external electrodes 131 and 132 disposed on the body, wherein the dielectric layer includes a first region extending from an interfacial surface with the internal electrode to 50 nm of the dielectric layer in an inward direction and a second region excluding the first region, and wherein, in the first region, an average content of In based on overall elements excluding oxygen is 0.5 at % or more and 2.0 at % or less, and an average content of Sn based on overall elements excluding oxygen is 0.5 at % or more and 1.75 at % or less.

The body 110 may include internal electrodes alternately disposed with dielectric layers 111.

The shape of the body 110 may not be limited to any particular shape, but as illustrated, the body 110 may have a hexahedral shape or a shape similar to a hexahedral shape. Due to reduction of ceramic powder included in the body 110 during a firing process, the body 110 may not have an exact hexahedral shape formed by linear edges but may have a substantially hexahedral shape.

The body 110 may have first and second surfaces 1 and 2 opposing each other in the first direction, third and fourth surfaces 3 and 4 connected to the first and second surfaces 1 and 2 and opposing in the second direction, and fifth and sixth surfaces 5 and 6 connected to the first and second surfaces 1 and 2 and the third and fourth surfaces 3 and 4 and opposing each other in the third direction. The plurality of dielectric layers 111 forming the body 110 may be in a fired state, and a boundary between the adjacent dielectric layers 111 may be integrated with each other such that the boundary may not be distinct without using a scanning electron microscope (SEM).

In an example embodiment, a raw material for forming the dielectric layer 111 is not limited to any particular example as long as sufficient capacitance may be obtained. For example, a barium titanate-based material, a lead composite perovskite-based material, or a strontium titanate-based material may be used. The barium titanate material may include $BaTiO_3$ ceramic powder, and an example of the ceramic powder may include $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1$, $0<y<1$) or $Ba(Ti_{1-y}Zr_y)O_3$ ($0<y<1$) in which Ca (calcium), Zr (zirconium) is partially dissolved in the solid solution. That is, the dielectric layer 111 may include an oxide including Ba and Ti.

Also, various ceramic additives, organic solvents, binders, dispersants, or the like, may be added to a raw material for forming the dielectric layer 111 in the example embodiment to powder such as barium titanate ($BaTiO_3$), and in an example embodiment, the dielectric layer 111 may include Sn and In. A method of including Sn and In in the dielectric layer 111 is not limited to any particular example, but the dielectric layer 111 may include Sn and In by including a material including Sn and In in a dielectric composition to be described later.

In an example embodiment, by configuring the dielectric layer 111 to include Sn and In and also adjusting the concentration and distribution thereof, capacitance properties of the ceramic electronic component 100, temperature coefficient of capacitance, and high-temperature reliability may be improved.

The average thickness t of dielectric layer 111 is not limited to any particular example.

For example, the thickness may be 10 μm or less. Also, the average thickness of the dielectric layer 111 may be arbitrarily determined depending on desired properties or usage. For example, in the case of electronic components for high voltage electric vehicles, the average thickness of the dielectric layer 111 may be 2.8 μm or less, and in the case of small IT electronic components, the average thickness of the dielectric layer 111 may be 0.35 μm or less to implement miniaturization and high capacitance, but an example embodiment thereof is not limited thereto.

When the average thickness td of the dielectric layer 111 is excessively thick, it may be difficult to improve capacitance of the ceramic electronic component 100, and when the average thickness is excessively thin, it may not be easy to control the distribution of Sn and In at a predetermined concentration in the first region R1 of the dielectric layer 111 as in an example embodiment.

In an example embodiment, by adjusting the average thickness td of the dielectric layer 111 to be 1.8 μm or more and 2.8 μm or less, the effect of improving the capacitance properties, temperature coefficient of capacitance and high-temperature reliability of the ceramic electronic component may improve.

The average thickness td of the dielectric layer 111 may refer to an average size of the dielectric layer 111 disposed between the first and second internal electrodes 121 and 122 in a first direction. When the body 110 includes a plurality of dielectric layers 111, the average thickness td of the dielectric layers 111 may refer to an average thickness of at least one of the plurality of dielectric layers 111.

The average thickness of the dielectric layer 111 may be measured by scanning a cross-section of the body 110 in the length and thickness directions (L-T) using a scanning electron microscope (SEM) with a magnification of 10,000. More specifically, an average value may be measured from the thicknesses of the dielectric layer 111 at 30 points spaced apart by an equal distance in the length direction in the scanned image. The 30 points at equal distances may be designated in the active portion Ac. Also, when the average value is measured by extending the measurement of the average value to ten dielectric layers 111, the average thickness of the dielectric layer 111 in the first direction may be further generalized. Other methods and/or tools appreciated by one of ordinary skill in the art, even if not described in the present disclosure, may also be used.

The body 110 may include a capacitance forming portion Ac disposed in the body 110 and forming capacitance including the first internal electrode 121 and the second internal electrode 122 alternately disposed with the dielectric layer 111 interposed therebetween, and cover portions 112 and 113 formed on upper and lower portions of the capacitance forming portion Ac in the first direction.

The capacitance forming portion Ac may contribute to capacitance formation of a capacitor, and may be formed by repeatedly laminating the plurality of first and second internal electrodes 121 and 122 with the dielectric layer 111 interposed therebetween.

The cover portions 112 and 113 may be disposed on one surface and the other surface of the capacitance forming portion Ac in a first direction.

The cover portions 112 and 113 may include an upper cover portion 112 disposed above the capacitance forming portion Ac in the first direction and a lower cover portion 113 disposed below the capacitance forming portion Ac in the first direction.

The upper cover portion 112 and the lower cover portion 113 may be formed by laminating a single dielectric layer or two or more dielectric layers on the upper and lower surfaces of the capacitance forming portion Ac in the thickness direction, respectively, and may prevent damages to the internal electrode caused by physical or chemical stress.

The upper cover portion 112 and the lower cover portion 113 may not include an internal electrode and may include the same material as that of the dielectric layer 111.

That is, the upper cover portion 112 and the lower cover portion 113 may include a ceramic material, for example, a barium titanate ($BaTiO_3$) ceramic material.

The thickness of the cover portions 112 and 113 is not limited to any particular example. For miniaturization and high capacitance of the ceramic electronic component, the average thickness of the cover portions 112 and 113 may be 100 μm or less, 30 μm or less, or 20 μm or less. Here, the average thickness of the cover portions 112 and 113 may refer to the average thickness of each of the first cover portion 112 and the second cover portion 113.

The average thickness tc of the cover portions 112 and 113 may refer to the size in the first direction, and may be an average value of sizes of the cover portions 112 and 113 measured at five points with an equal distance therebetween in the first direction in the upper or lower portions of the capacitance forming portion Ac. The average thickness tc may be measured by SEM or any other methods and/or tools appreciated by one of ordinary skill in the art, even if not described in the present disclosure.

Also, the margin portions 114 and 115 may be disposed on one surface and the other surface of the capacitance forming portion Ac.

The margin portions 114 and 115 may include a first margin portion 114 disposed on fifth surface 5 and a second margin portion 115 disposed on sixth surface 6 of the body 110. That is, the margin portions 114 and 115 may be disposed on both end surfaces of the ceramic body 110 in the width direction.

As illustrated in FIG. 3, the margin portions 114 and 115 may refer to a region between both ends of first and second internal electrodes 121 and 122 and the boundary surface of body 110 in the cross-section of the body 110 taken in the width-thickness (W-T) direction.

The margin portions 114 and 115 may prevent damages to the internal electrode caused by physical or chemical stress.

The margin portions 114 and 115 may be formed by forming internal electrodes by applying a conductive paste on a ceramic green sheet excluding a region in which the margin portion is formed.

Also, to suppress a step difference caused by the internal electrodes 121 and 122, after laminating, the internal electrodes may be cut out to be exposed to the fifth and sixth surfaces 5 and 6 of the body, and a single dielectric layer or two or more dielectric layers may be laminated on both side surfaces of the capacitance forming portion Ac in a third direction (width direction), thereby forming the margin portions 114 and 115.

The average width of the margin portions 114 and 115 is not limited to any particular example. However, for miniaturization and high capacitance of the ceramic electronic component, the average width of the margin portions 114 and 115 may be 100 µm or less, 20 µm or less, or 15 µm or less.

The average width of the margin portions 114 and 115 may refer to the average size in the third direction of the region in which the internal electrode is spaced apart from the fifth surface and the average size in the third direction of the region in which the internal electrode is spaced apart from the sixth surface, and may be an average value of the sizes of the margin portions 114 and 115 in the third direction measured at five points with an equal distance therebetween on the side surface of the capacitance forming portion Ac.

The internal electrodes 121 and 122 may include a first internal electrode 121 and a second internal electrode 122. The first and second internal electrodes 121 and 122 may be alternately disposed to oppose each other with the dielectric layer 111 included in the body 110 interposed therebetween, and may be exposed to the third and fourth surfaces 3 and 4 of the body 110, respectively.

The first internal electrode 121 may be spaced apart from the fourth surface 4 and may be exposed through the third surface 3, and the second internal electrode 122 may be spaced apart from the third surface 3 and may be exposed through the fourth surface 4. A first external electrode 131 may be disposed on the third surface 3 of the body and may be connected to the first internal electrode 121, and a second external electrode 132 may be disposed on the fourth surface 4 of the body and may be connected to the second internal electrode 122.

That is, the first internal electrode 121 may not be connected to the second external electrode 132 and may be connected to the first external electrode 131, and the second internal electrode 122 may not be connected to the first external electrode 131 and may be connected to the second external electrode 132. Accordingly, the first internal electrode 121 may be spaced apart from the fourth surface 4 by a predetermined distance, and the second internal electrode 122 may be spaced apart from the third surface 3 by a predetermined distance. Also, the first and second internal electrodes 121 and 122 may be spaced apart from the fifth and sixth surfaces of the body 110.

In this case, the first and second internal electrodes 121 and 122 may be electrically separated from each other by the dielectric layer 111 disposed therebetween.

The body 110 may be formed by alternately laminating a ceramic green sheet on which the first internal electrode 121 is printed and a ceramic green sheet on which the second internal electrode 122 is printed, and firing.

Materials forming the internal electrodes 121 and 122 are not limited to any particular example, and materials having excellent electrical conductivity may be used. For example, the internal electrodes 121 and 122 may include one or more of nickel (Ni), copper (Cu), palladium (Pd), silver (Ag), gold (Au), platinum (Pt), tungsten (W), titanium (Ti), aluminum (Al) and alloys thereof. However, the method of manufacturing the ceramic electronic component 100 according to an example embodiment may include Sn and In at a predetermined concentration in the dielectric composition, and since Sn and In are intensively distributed in the first region R1 of the dielectric layer 111, the internal electrode 121, 122 may not include Sn and In preferably.

Also, the internal electrodes 121 and 122 may be formed by printing a conductive paste for internal electrodes include one or more of nickel (Ni), copper (Cu), palladium (Pd), silver (Ag), gold (Au), platinum (Pt), tungsten (W), titanium (Ti), aluminum (Al) and alloys thereof on a ceramic green sheet. As the method of printing the conductive paste for the internal electrode, a screen-printing method or a gravure printing method may be used, but an example embodiment thereof is not limited thereto.

The average thickness te of the internal electrodes 121 and 122 is not limited to any particular example, and may be, for example, 3 µm or less. Also, the average thickness of the internal electrodes 121 and 122 may be arbitrarily determined according to desired properties or use. For example, in the case of electronic components for high voltage electric vehicles, the average thickness of internal electrodes 121 and 122 may be less than 1 µm, and in the case of electronic components for small IT, the average thickness of internal electrodes 121 and 122 may be 0.35 µm or less to implement miniaturization and high capacitance, but an example embodiment thereof is not limited thereto.

An average thickness te of at least one of the plurality of internal electrodes 121 and 122 may refer to an average size of the internal electrodes 121 and 122 in the first direction.

The average thickness of the internal electrodes 121 and 122 may be measured by scanning a cross-section of the body 110 in the length and thickness direction (L-T) using a scanning electron microscope (SEM) with a magnification of 10,000. More specifically, an average value may be measured from the thicknesses of the internal electrodes at 30 points spaced apart by an equal distance in the second direction in the scanned image. The 30 points at equal distances may be designated in the active portion Ac. Also, when the average value is measured by extending the measurement of the average value to ten internal electrodes, the average thickness of the internal electrodes may be further generalized. Other methods and/or tools appreciated by one of ordinary skill in the art, even if not described in the present disclosure, may also be used.

The external electrodes 131 and 132 may be disposed on the body 110. Specifically, the external electrodes 131 and 132 may be disposed on the third surface 3 and the fourth surface 4 of the body 110.

The external electrodes 131 and 132 may include first and second external electrodes 131 and 132 disposed on the third and fourth surfaces 3 and 4 of the body 110, respectively, and connected to the first and second internal electrodes 121 and 122, respectively.

In the example embodiment, a structure in which the ceramic electronic component 100 has two external electrodes 131 and 132 is described, but the number of the external electrodes 131 and 132 and a shape thereof may be varied depending on the shape of the internal electrodes 121 and 122 and other purposes.

The external electrodes 131 and 132 may be formed using any material as long as the material has electrical conductivity, such as metal, and a specific material may be determined in consideration of electrical properties, structural stability, and may further have a multilayer structure.

For example, the external electrodes 131 and 132 may include an electrode layer disposed on the body 110 and a plating layer formed on the electrode layer.

As a more specific example of the electrode layer, the electrode layer may be a fired electrode including a conductive metal and glass or a resin-based electrode including a conductive metal and resin.

Also, in the electrode layer, a fired electrode and a resin-based electrode may be formed in order on the body. Also, the electrode layer may be formed by transferring a sheet including a conductive metal to the body or by transferring a sheet including a conductive metal to a fired electrode.

A material having excellent electrical conductivity may be used as the conductive metal included in the electrode layer, and is not limited to any particular example. For example, the conductive metal may be one or more of nickel (Ni), copper (Cu) and alloys thereof.

The plating layer may improve mounting properties. The type of plating layer is not limited to any particular example, and may be a plating layer including at least one of Ni, Sn, Pd and alloys thereof, and may be formed of a plurality of layers.

For a more specific example of the plating layer, the plating layer may be a Ni plating layer or a Sn plating layer, and may have a form in which the Ni plating layer and the Sn plating layer are formed in order on the electrode layer, and a Sn plating layer, an Ni plating layer and a Sn plating layer may be formed in order. Also, the plating layer may include a plurality of Ni plating layers and/or a plurality of Sn plating layers.

The size of the ceramic electronic component 100 is not limited to any particular example. In an example embodiment to be described later, a sample of a ceramic electronic component having a size of 3.2 mm×1.6 mm was manufactured, but the example embodiment and various example embodiments may be similarly applied to a ceramic electronic component having a size larger or smaller than the above example.

The dielectric layer 111 of the ceramic electronic component 100 according to an example embodiment may include a first region R1, which is a region from the interfacial surface IF with the internal electrodes 121 and 122 to 50 nm in the inward direction of dielectric layer 111, and a second region R2, which is a region other than the first region R1, and an average content of In based on overall elements excluding oxygen in the first region may be 0.5 at % or more and 2.0 at % or less, and an average content of Sn based on overall elements excluding oxygen may be 0.5 at % or more and 1.75 at % or less.

Generally, as a method of improving reliability and capacitance properties of a ceramic electronic component, rare earth or transition metals may be added to the dielectric layer, and a volatile metal element may be added to the Ni internal electrode. However, the methods may have limitations in securing desired capacitance properties, high-temperature reliability and temperature coefficient of capacitance simultaneously in that various variables such as adjusting the type of additive element, content, firing atmosphere, and microstructure after firing.

Accordingly, in example embodiments, by adding In and Sn to the dielectric layer as main additives and adjusting to have a predetermined distribution on the boundary surface with the internal electrode, at least one of the capacitance properties, temperature coefficient of capacitance (TCC), and high-temperature reliability of ceramic electronic components may be improved.

In the example embodiment, room-temperature permittivity and dissipation factor (DF) value of the dielectric layer 111 may be properties related to capacitance, and high-temperature insulation resistance and mean time to failure (MTTF) values may be properties related to high-temperature reliability.

Referring to FIG. 5, in the ceramic electronic component 100 according to an example embodiment, the dielectric layer 111 may include a first region R1, which is a region from the interfacial surface IF with the internal electrodes 121 and 122 to 50 nm in the inward direction of dielectric layer 111, and a second region R2, which is a region other than the first region.

The dielectric layer 111 and the internal electrodes 121 and 122 may be formed by forming a ceramic green sheet to be described later, printing a conductive paste for internal electrode on the ceramic green sheet, laminating to form a laminate, firing, and forming an interfacial surface. The internal electrodes 121 and 122 and the interfacial surface IF of the dielectric layer 111 may be defined as points in which the content of elements included in the dielectric layer 111 and internal electrodes 121 and 122 rapidly changes. Specifically, in an example embodiment, regions in which the content of Ni is 90 at % or more based on overall elements excluding oxygen may be regarded as the internal electrodes 121 and 122, and the regions in which the Ni content starts to decrease to 90 at % or less based on overall elements other than oxygen may be defined as the interfacial surface IF of the internal electrodes 121 and 122 of the dielectric layer 111. However, a region in which the Ni content decreases continuously to 90 at % or less based on overall elements excluding oxygen may be present between the dielectric layer 111 and the internal electrodes 121 and 122. Accordingly, the first region R1 of the dielectric layer 111 and the internal electrodes 121 and 122 defined in an example embodiment may be a region in which the content of Ni based on overall elements excluding oxygen may decrease to 90 at % or less continuously from the interfacial surface, and may be a region of 50 nm in the inward direction of the dielectric layer 111 from the interfacial surface IF.

FIG. 6 is a graph illustrating a result of line profile analysis of measuring contents of Ni, In, and Sn elements using STEM-EDS along regions corresponding to p, q, and r regions in FIG. 5 in a ceramic electronic component according to a comparative embodiment.

The comparative example according to FIG. 6 may be an example of a ceramic electronic component in which indium tin oxide (ITO) is not added to the dielectric composition, and may correspond to an example in which the dielectric layer does not substantially include In and Sn. That is, contents of In and Sn based on overall elements excluding oxygen detected in the dielectric layer of the ceramic electronic component according to the comparative example may be less than 0.5 at %, which may be an example in which the dielectric layer does not substantially include In and Sn.

In an example embodiment, in the graph illustrating the line profile analysis results according to FIG. 7, the average content of Sn and In included in the first region R1 may be measured by calculating an average value of In and Sn content in a region from the interfacial surface IF (horizontal axis value=0) of the dielectric layer 111 with the internal electrodes 121 and 122 to 50 nm (horizontal axis value=50) in the inward direction of dielectric layer.

The line profile analysis according to FIG. 7 may be performed in the p, q and r regions illustrated in FIG. 5. Specifically, the p region and r region may be determined as a region approximate to the interfacial surface between the internal electrodes 121 and 122 and the dielectric layer 111, and the q region may be determined as a central region of the dielectric layer. In this case, the p region and the r region may be determined to a width×length=250 nm×250 nm region, and the q region may be determined to a width×height=300 nm×300 nm region. The p, q and r regions may not be necessarily disposed on a straight line in the second direction.

Also, the graph illustrating the line profile analysis result according to FIG. 7 may indicate the ratio of contents of Ni, In, and Sn based on the content of overall elements excluding oxygen (O) among the elements detected through STEM-EDS. Generally, the contents of Ni, In, and Sn, and the ratios may be measured by methods and/or tools appreciated by one of ordinary skill in the art, even if not described in the present disclosure. The overall elements may include In, Sn, Ni, and inevitable impurities.

Also, the average value of the contents of In and Sn may be further generalized by determining a plurality of p, and r regions, performing line profile analysis, and obtaining an average value. Specifically, the ceramic electronic component 100 may be polished to the center of the third direction to expose the cross-section in the first and second directions, a plurality of p, and r regions may be determined in the regions of the dielectric layer 111 and the internal electrodes 121 and 122 disposed in the central portion of the capacitance forming portion Ac, and an average value may be obtained for the content of Ni, In and Sn calculated through STEM-EDS line profile analysis.

Also, in an example embodiment, the average value of the content of In and Sn based on overall elements excluding oxygen may be further generalized by measuring the average content of each element in upper portion and lower portion formed by dividing the capacitance forming portion Ac into three regions, an upper portion, a central portion, a lower portion, in the first direction, in addition to the region of the dielectric layer 111 and the internal electrode 121, 122 disposed in the central portion of capacitance forming portion Ac.

Since the components included in the dielectric composition forming the dielectric layer 111 may be in the form of oxides in the dielectric composition state, an oxygen (O) element in addition to metal elements such as In and Sn may be detected in the dielectric layer 111 after firing. In addition to metal elements such as Ni, rare earth elements, and additive elements, oxygen contained in the internal electrodes 121 and 122 may be diffused to the internal electrode side, or in addition to metal elements such as Ni, rare earth elements and additive elements, oxygen (O) elements may be detected by the oxide-type components added before firing of the internal electrode. The content (at %) of In, Sn and various additive elements described in example embodiments were determined as the content (at %) of the element based on overall elements excluding oxygen.

Referring to FIG. 6, in the comparative example, a point at which the Ni content starts to decrease to 90 at % or less based on overall elements excluding for oxygen may be specified. However, the content of In based on overall elements excluding oxygen and the content of Sn based on overall elements excluding oxygen, which may be measured in the region from the point at which the content of Ni based on overall elements excluding oxygen starts to decrease to 90 at % or less to 50 nm from the interfacial surface toward the dielectric layer, may be less than 0.5 at %, which is measured as a noise level.

Referring to FIG. 7, in the first region R1 from the interfacial surface with the internal electrodes 121 and 122 of the dielectric layer 111 to 50 nm in the inward direction of the dielectric layer in the example embodiment, the average content of In based on overall elements excluding oxygen was 0.5 at % or more and 2.0 at % or less, and the average content of Sn based on overall elements excluding oxygen was 0.5 at % or more and 1.75 at % or less.

Also, the content of In and Sn included in the first region R1, which is a 50 nm point in the inward direction of the dielectric layer from the interfacial surface with the internal electrodes 121 and 122 of the dielectric layer 111 was greater than contents of In and Sn included in second region R2 or internal electrodes 121 and 122. That is, in an example embodiment, In and Sn may be intensively distributed in the first region R1.

When the In and Sn elements are intensively distributed approximately to the dielectric layer 111 and the interfacial surfaces of the internal electrodes 121 and 122, reliability of the ceramic electronic component 100 may be improved. However, when the In and Sn elements are excessively diffused toward the internal electrode or into the dielectric layer 111, capacitance properties may deteriorate or temperature coefficient of capacitance and high-temperature reliability may deteriorate. Accordingly, in example embodiments, by including In and Sn approximately to the interfacial surface between the dielectric layer 111 and the internal electrodes 121 and 122, the effect of improving high-temperature reliability may be obtained, and by preventing excessive diffusion of In and Sn into internal electrode 121, 122 or inside dielectric layer 111, one or more of excellent capacitance properties and temperature coefficient of capacitance may be improved.

As in an example embodiment, when the average content of In based on overall elements excluding oxygen in the first region R1 is adjusted to be 0.5 at % or more and 2.0 at % or less, and the average content of Sn based on overall elements excluding oxygen is adjusted to be 0.5 at % or more and 1.75 at % or less, In and Sn may be concentrated toward the dielectric layer 111 on the interfacial surface between the dielectric layer 111 and the internal electrodes 121 and 122, such that the degradation of capacitance caused by In and Sn diffused into the internal electrode may be prevented. Also, by concentrating In and Sn on the first region R1, which is a region from the interfacial surface with the internal electrodes 121 and 122 of the dielectric layer 111 to 50 nm in the inward direction of the dielectric layer, excessive diffusion of In and Sn into the dielectric layer 111 such as the second region R2 of the dielectric layer 111 may also be prevented.

That is, as in an example embodiment, when the average content of In based on overall elements excluding oxygen in the first region R1 is 0.5 at % or more and 2.0 at % or less, and the average content of Sn based on overall elements excluding oxygen is 0.05 at % or more 1.75 at %, high-temperature reliability such as mean time to failure (MTTF) and high-temperature insulation resistance (IR) of the ceramic electronic component 100 may improve, and at least one of temperature coefficient of capacitance, such as capacitance and temperature coefficient of capacitance (TCC) at room-temperature, may be improved.

More specifically, in an example embodiment, in the ceramic electronic component 100, an average content of In based on overall elements excluding oxygen in the first region R1 may be adjusted to be 0.5 at % or more and 2.0 at % or less, and the average content of Sn based on overall elements excluding oxygen may be adjusted to be 0.5 at % or more and 1.75 at % or less, such that one or more properties of permittivity of 2500 or more, MTTF of 200 hours or more, a high-temperature IR value of 1.0E+07Ω or more, and a TCC change rate of −22% or more and 22% or less in a temperature range of −55° C. to 125° C. may be satisfied, and more preferably, the entirety of one or more properties of permittivity of 2500 or more, MTTF of 200 hours or more, a high-temperature IR value of 1.0E+07Ω or more, and a TCC change rate of −22% or more and 220 or less in a temperature range of −55° C. to 125° C. may be satisfied.

A manufacturing method to implement the example in which an average content of In based on overall elements excluding oxygen is 0.5 at % or more and 2.0 at % or less in the first region R1, and the average content of Sn based on overall elements excluding oxygen is 0.5 at % or more and 1.75 at % or less is not limited to any particular example, and the composition and content of In and Sn in the first region by adjusting one or more of the content of In and Sn added to the dielectric layer, the type of addition of In and Sn, firing temperature, firing atmosphere, and the type and content of subcomponent elements of dielectric composition. Distribution may be determined as in a method of manufacturing the ceramic electronic component in an example embodiment and various example embodiments thereof.

In an example embodiment, when the average content of In based on overall elements excluding oxygen in the first region R1 is defined as I1, the average content of In based on overall elements excluding oxygen in the second region R2 is defined as I2, the average content of Sn based on overall elements excluding oxygen in the first region is defined as S1, and the average content of Sn based on overall elements excluding oxygen in the second region is defined as S2, I1>I2 and S1>S2 may be satisfied. Accordingly, by adjusting the Sn and a content of In included in the first region R1 of the dielectric layer 111 to be higher than that of the second region R2 of the dielectric layer 111, excellent capacitance properties, high-temperature reliability and temperature coefficient of capacitance may be secured.

In an example embodiment, when an average content of In based on overall elements excluding oxygen of the internal electrode is defined as I3, and an average content of Sn based on overall elements excluding oxygen of the internal electrode is defined as S3, I1>I2>I3 and S1>S2>S3 may be satisfied. Accordingly, by more intensely disposing In and Sn in the first region R1 of the dielectric layer 111, excellent high-temperature reliability and temperature coefficient of capacitance may be secured, and by diffusing In and Sn into the internal electrode 121 and 122 or the second region R2, capacitance deterioration or insulation resistance deterioration may be prevented.

In this case, the absolute numbers of I1 to I3 and S1 to S3 may be adjusted by adjusting one or more of the size of the ceramic electronic component 100, the content of Sn and In added to the dielectric composition forming the dielectric layer 111, the form of adding In and Sn, firing temperature, firing atmosphere, and type and content of subcomponent elements in a dielectric composition.

Referring to FIG. 8, when line profile analysis of the q region in FIG. 5 is performed through STEM-EDS, the average content of In based on overall elements excluding oxygen and the average content of Sn based on overall elements excluding oxygen may be 1.0 at % or less. When the line profile analysis is repeatedly performed in an arbitrary q region and the average value of each element content is obtained, I2 may be 1.0 at % or less, and S2 may be 1.0 at % or less.

Referring to FIG. 7, the average content of In and Sn of the internal electrode may be less than that of the first region or the second region, and each of the average content of In based on overall elements excluding oxygen of the internal electrode and the average content of Sn based on overall elements excluding oxygen may be less than 0.5 at %. That is, in an example embodiment, I3 may be less than 0.5 at %, and S3 may be less than 0.5 at %. Here, since the numerical value of "less than 0.5 at %" may refer to a value corresponding to the noise level in the result measured by STEM-EDS, it may be indicated that Sn and In are not substantially included in the internal electrode.

The average content of In based on overall elements excluding oxygen of the internal electrode I3 and the average content of Sn based on overall elements excluding oxygen S3 may be measured by line profile analysis using STEM-EDS for an arbitrary region in the internal electrode not exceeding the interfacial surface IF of the internal electrodes 121 and 122 of the dielectric layer 111. By obtaining the average value after performing the measurements in a plurality of regions with a plurality of internal electrodes, the average content of In based on overall elements excluding oxygen of the internal electrode I3 and the average content of Sn based on overall elements excluding oxygen S3 may be further generalized. Specifically, the cross-section in the first and second directions may be exposed by polishing to the center of the third direction of the ceramic electronic component 100, the capacitance forming portion Ac may be divided into three portions, an upper portion, a central portion, and a lower portion, in the first direction, and the average value of a content of Sn based on overall elements excluding oxygen and a content of In based on overall elements excluding oxygen may be obtained.

Among the internal electrodes 121, 122, the dielectric layer 111, the interfacial surface between the internal electrodes 121 and 122, the first region of the dielectric layer 111 and the second region of the dielectric layer 111, there may be a peak value in which the content of Sn based on overall elements excluding oxygen and a content of In based on overall elements excluding oxygen have maximum values. When there is a peak value in which the contents of In and Sn based on overall elements excluding oxygen has maximum values in the first region, it may be indicated that In and Sn are concentrated in the first region. In terms of securing excellent high-temperature reliability and temperature coefficient of capacitance and preventing capacitance degradation, the peak value of a content of In based on overall elements excluding oxygen in the first region may be 1.2 at % or more, and the peak value of a content of Sn based on overall elements excluding oxygen may be 1.0 at % or more, but an example embodiment thereof is not limited thereto.

As described above, the dielectric layer 111 may be formed of a dielectric composition including barium titanate ($BaTiO_3$), as a main component. Accordingly, the dielectric layer 111 in a fired state may include Ba and Ti as main component elements. Sn and In may be added according to an example embodiment. However, as the firing of the dielectric layer 111 is performed in a reducing atmosphere as described later, appropriate reduction resistance may need to be provided, and a withstand voltage of the ceramic electronic component 100, and since it is necessary to improve various properties such as withstand voltage and high-temperature reliability of ceramic electronic component 100, the dielectric layer 111 may include various subcomponent elements in addition to the main component elements.

In an example embodiment, the dielectric layer may include one or more of Mn, V, Cr, Fe, Ni, Co, Cu and Zn as a first subcomponent element, and the content of the first subcomponent element based on overall elements excluding oxygen may be greater than 0 at % and 0.6 at % or less.

The first subcomponent element, as a valance-variable acceptor element, may lower the firing temperature of the dielectric layer 111 and may improve high-temperature reliability. In this case, when the content of the first subcomponent element based on overall elements excluding oxygen is 0 at %, the effect of improving permittivity may not be obtained, and when the content exceeds 0.6 at % based on overall elements excluding oxygen, high-temperature reliability and temperature coefficient of capacitance of the ceramic electronic component 100 may deteriorate. Accordingly, by improving permittivity by adjusting the content of the first subcomponent element to more than 0 at % and less than 0.6 at % based on overall elements excluding oxygen included in the dielectric layer 111, capacitance of the ceramic electronic component 100 may improve and excellent high-temperature reliability and temperature coefficient of capacitance may be secured.

In an example embodiment, the dielectric layer may include Mg as a second subcomponent element, and the content of the second subcomponent element may be 0.3 at % or more and 0.6 at % or less based on overall elements excluding oxygen.

The second subcomponent element may prevent grain growth of the dielectric included in the dielectric layer 111 and providing reduction resistance during a firing process in a reducing atmosphere. Accordingly, by including the second subcomponent element in the dielectric layer 111, high-temperature reliability and temperature coefficient of capacitance of a ceramic electronic component may be improved.

However, when the content of the second subcomponent element based on overall elements excluding oxygen is less than 0.3 at %, high-temperature reliability and temperature coefficient of capacitance may not be sufficiently improved due to excessive grain growth of the dielectric layer 111, and the when the content of the second subcomponent element based on overall elements exceeds 0.6 at %, due to excessive grain growth suppression of the dielectric layer 111, permittivity may be reduced. Accordingly, by adjusting the content of the second subcomponent element to 0.3 at % or more and 0.6 at % or less based on overall elements excluding oxygen, capacitance of the ceramic electronic component 100 may be improved and excellent high-temperature reliability and temperature coefficient of capacitance may be secured.

In an example embodiment, the dielectric layer may include one or more of Y, Dy, Ho, Er, Gd, Ce, Nd, Sm, Tb, Tm, La, Gd and Yb as a third subcomponent element, and content of the third subcomponent element based on overall elements excluding oxygen of 0.6 at % or more and 1.8 at % or less. Accordingly, capacitance of the ceramic electronic component 100 may be improved, and excellent high-temperature reliability and temperature coefficient of capacitance may be secured.

The third subcomponent element may be a rare earth element (RE), and may improve HALT reliability and permittivity. However, the effect in the example embodiment may be more significant when the dielectric layer 111 includes two or more elements instead of including only one of the third subcomponent elements, and in particular, the dielectric layer 111 may include both Dy and Tb.

In an example embodiment, a dielectric layer may include Si as a fourth subcomponent element, and a content of the fourth subcomponent element may be 1.0 at % or more and 2.0 at % or less based on overall elements excluding oxygen.

The fourth subcomponent element may control diffusion degrees of the first to third subcomponent elements. When the content of the fourth subcomponent element based on overall elements excluding oxygen is less than 1.0 at %, the third subcomponent, which greatly affects reliability, may not be diffused properly, such that it may be difficult to obtain the effect in the example embodiment. Also, when the content of the fourth subcomponent element exceeds 2.0 at % based on overall elements excluding oxygen, it may be difficult to secure sufficient permittivity and MTTF.

Accordingly, by adjusting the content of the fourth subcomponent element to be 1.0 at % or more and 2.0 at % or less based on overall elements excluding oxygen, the capacitance of the ceramic electronic component 100 may be improved and excellent high-temperature reliability and temperature coefficient of capacitance may be obtained.

Also, the quantitative content of each element included in the first to fourth subcomponents included in the dielectric layer 111 may be measured using a destructive method. Specifically, the measurement method using the destructive method may include grinding the ceramic electronic component, removing the internal electrode, selecting the dielectric portion, and quantitatively analyzing the selected dielectric components using devices such as inductively coupled plasma-optical emission spectroscopy (ICP-OES) and inductively coupled plasma-optical emission spectrometry (ICP-MS). Other methods and/or tools appreciated by one of ordinary skill in the art, even if not described in the present disclosure, may also be used.

When analyzing the quantitative content of elements included in the first to fourth subcomponents of the dielectric layer 111, the oxygen (O) element may have low sensitivity, such that it may be difficult to analyze the inductively coupled plasma. Accordingly, in example embodiments, the content (at %) of the elements included in the first to fourth subcomponents included in the dielectric layer 111 was determined as the content (at %) of the corresponding element based on overall elements excluding oxygen.

Method of Manufacturing Ceramic Electronic Component

Figure 9:
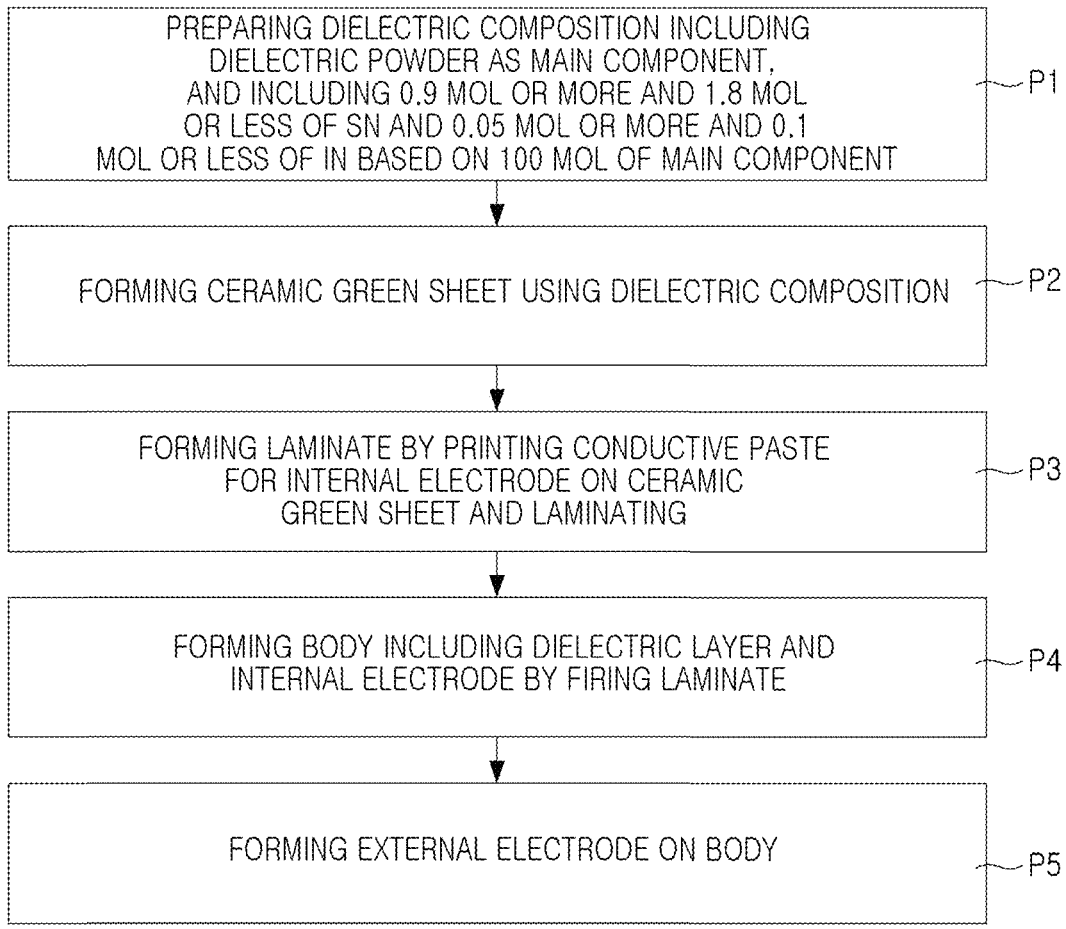
FIG. 9 is a flowchart illustrating processes of a method of manufacturing a ceramic electronic component in order according to an example embodiment of the present disclosure.

FIG. 9 is a flowchart illustrating processes of a method of manufacturing a ceramic electronic component in order according to an example embodiment.

The method of manufacturing the ceramic electronic component according to an example embodiment may include preparing a dielectric composition including dielectric powder as a main component and including 0.9 mol or more and 1.8 mol or less of Sn and 0.05 mol or more and 0.1 mol or less of In based on 100 mol of the main component (P1), forming a ceramic green sheet using the dielectric composition (P2), forming a laminate by printing conductive paste for an internal electrode on the ceramic green sheet and laminating (P3), forming a body including a dielectric layer and an internal electrode by firing the laminate (P4); and forming an external electrode on the body (P5), as illustrated in FIG. 9.

(P1: Preparing Dielectric Composition)

In process P1 of preparing the dielectric composition, a dielectric composition in which dielectric powder is included as a main component, 0.9 mol or more and 1.8 mol or less of Sn is included, and 0.05 mol or more and 0.1 mol or less of In based on 100 mol of the main component is included may be prepared.

The dielectric composition may include dielectric powder as a main component.

As dielectric powder, $BaTiO_3$ ceramic powder or $(Ba_{1-x}Ca_x)TiO_3$ ($0<x<1$), Ba $(Ti_{1-y}Ca_y)O_3$ ($0<y<1$), $(Ba_{1-x}Ca_x)$ $(Ti_{1-y}Zr_y)O_3$ (0<x<1, 0<y<1) or $Ba(Ti_{1-y}Zr_y)O_3$ (0<y<1) in which calcium (Ca), zirconium (Zr) are partially employed in $BaTiO_3$.

In addition to the above main component, the dielectric composition preferably may include 0.9 mol or more and 1.8 mol or less of Sn and 0.05 mol or more and 0.1 mol or less of In based on 100 mol of the main component.

The content of Sn and In included in the dielectric composition may be a variable controlling the distribution of Sn and In in the dielectric layer 111 of the ceramic electronic component 100. When the content of Sn and In exceeds the above range, the MTTF value of the ceramic electronic component 100 may decrease or the X7S properties may not be satisfied, and it may be difficult to control the average content of In included in the first region R1 of the dielectric layer 111 in the example embodiment to be 0.5 at % or more and 2.0 at % or less and the average content of Sn to be 0.5 at % or more and 1.75 at % or less.

The form in which Sn and In included in the dielectric composition are added is not limited to any particular example. For example, Sn oxide and In oxide may be mixed at a predetermined ratio and may be added to the dielectric composition. However, when Sn and In are added to the dielectric composition in the form of indium tin oxide (ITO), the reliability improvement effect of the ceramic electronic component 100 in the example embodiment may be improved.

Indium tin oxide (ITO) may be a material in which indium oxide ($In_2O_3$) and tin oxide ($SnO_2$) are mixed in a predetermined ratio. In an example embodiment, indium tin oxide including In: 74 wt %, O: 18 wt % and Sn: 8 wt % was added to the dielectric composition, but an example embodiment thereof is not limited thereto, and even when indium tin oxide having a different composition is added, by adjusting the amount thereof, the concentration of Sn and In in the dielectric composition may be adjusted.

When indium tin oxide including In: 74 wt %, O: 18 wt % and Sn: 8 wt % is added to the dielectric composition according to an example embodiment, the content of the indium tin compound included in the dielectric composition may be 0.5 mol or more and 1.0 mol or less based on 100 mol of the main component, which may be advantageous to improving reliability of the ceramic electronic component 100.

In an example embodiment, a dielectric composition may include a first subcomponent which may include one or more of an oxide or carbonate of a valance-variable acceptor element.

An element included in the first subcomponent may lower the firing temperature of the dielectric layer 111 and may improve high-temperature reliability. In this case, the valance-variable acceptor element may refer to one or more of Mn, V, Cr, Fe, Ni, Co, Cu and Zn.

When the content of the first subcomponent is less than 0.1 mol based on 100 mol of the main component, it may be difficult to improve permittivity of the dielectric layer 111, and when the content of the first subcomponent exceeds 0.3 mol based on 100 mol of the main component, the high-temperature reliability and temperature coefficient of capacitance of the ceramic electronic component 100 may deteriorate.

Accordingly, when the dielectric composition includes the first subcomponent in a content of 0.1 mole or more and 0.3 mole or less based on 100 moles of the main component, capacitance of the ceramic electronic component 100 may be improved, and excellent high-temperature reliability and temperature coefficient of capacitance may be assured.

After firing, in the ceramic electronic component 100, the content of the first subcomponent element based on overall elements excluding oxygen included in the dielectric layer 111 may be more than 0 at % and less than 0.6 at %.

In an example embodiment, the dielectric composition may include a second subcomponent which may include one or more of an oxide or carbonate of Mg.

An element included in the second subcomponent may prevent particle growth of the dielectric included in the dielectric layer 111 and may provide reduction resistance during a firing process in a reducing atmosphere.

When the content of the second subcomponent is less than 0.3 moles based on 100 moles of the main component, due to excessive grain growth of the dielectric layer 111, high-temperature reliability and temperature coefficient of capacitance may not be sufficiently improved, and when the content of the second subcomponent exceeds 0.9 moles based on 100 moles of the main component, due to excessive suppression of grain growth in the dielectric layer 111, permittivity may be reduced.

Accordingly, when the second subcomponent is included in a content of 0.3 mol or more and 0.9 mol or less based on 100 mol of the main component in the dielectric composition, capacitance of ceramic electronic component 100 may be improved, and excellent high-temperature reliability and temperature coefficient of capacitance may be secured.

After firing, in the ceramic electronic component 100, the content of the second subcomponent element based on overall elements excluding oxygen included in the dielectric layer 111 may be 0.3 at % or more and 0.6 at % or less.

In an example embodiment, the dielectric composition may include a third subcomponent which may include one or more of oxides and carbonates of rare earth elements.

The third subcomponent may improve high-temperature reliability and dielectric layer permittivity. In this case, the rare earth element may be one or more of Y, Dy, Ho, Er, Gd, Ce, Nd, Sm, Tb, Tm, La, Gd and Yb.

In an example embodiment, by including the third subcomponent in a content of 0.3 mol or more and 0.9 mol or less based on 100 mol of the main component, the dielectric composition may improve capacitance of the ceramic electronic component 100, and excellent high-temperature reliability and temperature coefficient of capacitance may be obtained.

After firing, in the ceramic electronic component 100, the content of the third subcomponent element based on overall elements excluding oxygen included in the dielectric layer 111 may be 0.6 at % or more and 1.8 at % or less.

When the dielectric layer 111 includes an oxide or carbonate including two or more of the rare earth elements rather than including only one of the third subcomponent elements, reliability of the ceramic electronic component 100 may improve.

For example, by adding both rather than adding only $Tb_4O_7$ or only $Dy_2O_3$ as a third subcomponent, capacitance of ceramic electronic component 100 may improve by improved permittivity, and high-temperature reliability and temperature coefficient of capacitance may improve.

More specifically, when adding only $Tb_4O_7$ as the third subcomponent to the dielectric composition in a content of 0.6 mol or more based on 100 mol of the main component, high-temperature insulation resistance and MTTF values may be lowered. Also, when only $Dy_2O_3$ is added in a content of 0.6 mol or more as the third subcomponent, properties such as temperature coefficient of capacitance and high-temperature reliability may be improved, but permittivity may be lowered.

Accordingly, when the dielectric composition includes both $Tb_4O_7$ and $Dy_2O_3$ as the third subcomponent, the content of $Tb_4O_7$ may be 0.1 mol or more and 0.4 mol or less based on 100 mol of the main component, and the content of $Dy_2O_3$ may be 0.2 mol or more and 0.5 mol or less based on 100 mol of the main component.

In an example embodiment, the dielectric composition may include a fourth subcomponent which may include one or more of an oxide of Si, a carbonate of Si and a glass including Si.

An element included in the fourth subcomponent may controlling the degree of diffusion of the first to third subcomponent elements in the dielectric layer 111.

When the content of the fourth subcomponent is less than 1.0 moles based on 100 moles of the main component, it may be difficult to obtain the effect in the example embodiment as the third subcomponent, which may greatly affect reliability, may not be diffused properly, and when the content of the fourth subcomponent exceeds 2.0 moles based on 100 moles of the main component, it may be difficult to secure sufficient permittivity and MTTF.

Accordingly, by including the fourth subcomponent at 1.0 mol or more and 2.0 mol or less based on 100 mol of the main component in the dielectric composition, capacitance of the ceramic electronic component 100 may improve, and excellent high-temperature reliability and temperature coefficient of capacitance may be assured.

(P2: Forming Ceramic Green Sheet)

A ceramic green sheet may be formed using the dielectric composition.

The dielectric composition may be prepared as a slurry by mixing and milling with a binder before being formed into a ceramic green sheet. The slurry prepared as above may be formed as a ceramic green sheet using a molding device for producing a sheet.

As for the ceramic green sheet, a ceramic green sheet for the capacitance forming portion Ac and a ceramic green sheet for the cover portions 112 and 113 may be separately prepared. The compositions of the ceramic green sheet for the capacitance forming portion Ac and the ceramic green sheet for the cover portions 112 and 113 may be substantially the same, but to obtain the respective functions of the cover portions 112 and 113 and the capacitance forming portion Ac, the compositions may be different.

(P3: Forming Laminate)

Thereafter, a conductive paste for internal electrode may be printed on the ceramic green sheet.

The conductive paste for the internal electrode may be paste including one or more of nickel (Ni), copper (Cu), palladium (Pd), silver (Ag), gold (Au), platinum (Pt), tin (Sn), tungsten (W), titanium (Ti), indium (In), aluminum (Al) and alloys thereof.

The conductive paste for the internal electrode may be formed on a ceramic green sheet and may be spaced apart at a predetermined distance. That is, the conductive paste for the internal electrode may be of a stripe type.

Subsequently, by laminating a plurality of ceramic green sheets on which the conductive paste for the internal electrode is printed, a laminate may be formed.

In the forming a laminate, a plurality of ceramic green sheets printed with the conductive paste for the internal electrode may be compressed and laminated to form a compressed bar, and the compressed bar may be cut into an appropriate size using a cutting device, thereby preparing a laminate.

(P4: Forming Body)

Thereafter, the prepared laminate may be fired to form a body 110 including a dielectric layer 111 and internal electrodes 121 and 122.

In an example embodiment, a calcining process may be performed on the laminate before the firing, and after calcining, the laminate may be hold at the temperature of 1150-1200° C. for 2 hours in a reducing atmosphere of 0.1% $H_2$/99.9% $N_2$-0.5% $H_2$/99.5% $N_2$, and firing may be performed.

In an example embodiment, after the firing, reoxidizing at 1040° C. in an N2 atmosphere for 3 hours may be further included.

In the process of firing the body 110, the dielectric layer 111 may also be fired. In this case, the concentration distribution of Sn and In included in the dielectric layer 111 may vary depending on the firing atmosphere. That is, the firing atmosphere of the body 110 may be another variable controlling the distribution of Sn and In in the dielectric layer 111.

In a firing atmosphere in which the hydrogen concentration is lowered, as In and Sn included in the dielectric composition are dispersed, such that permittivity and DF level of the dielectric layer 111 may be improved, but due to non-uniform grain growth, it may be difficult to improve temperature coefficient of capacitance and high-temperature reliability.

Accordingly, by performing the firing in an atmosphere of EMF of 730 mV or more and 760 mV or less, in an example embodiment, capacitance properties, temperature coefficient of capacitance and high-temperature reliability of the ceramic electronic component 100 may be improved. In this case, when the EMF in the above range is converted into hydrogen concentration, the firing may be performed in an atmosphere with a hydrogen concentration of 0.2 vol % or more and 0.4 vol % or less. The EMF (electromotive force) value may vary depending on the hydrogen concentration and the temperature of the measuring sensor, and the EMF value in example embodiments may correspond to a value measured at a sensor temperature of 850° C.

(P5: Forming External Electrode)

Thereafter, external electrodes 131 and 132 may be formed on the body 110 formed by firing the laminate.

The external electrodes 131 and 132 may be formed by conductive paste for external electrodes with respect to the fired body 110, which may undergo a termination process and a firing process. The external electrode may also be formed by a wet plating method such as electrolytic plating or electroless plating or a dry plating method such as sputtering, other than the method using a conductive paste for external electrode.

Hereinafter, effects of the ceramic electronic component and the method of manufacturing the ceramic electronic component according to an example embodiment will be described with reference to various example embodiments.

A sample of the ceramic electronic component used in each example embodiment was prepared as below, and the contents of ITO and the first to fourth subcomponents in Tables 1 to 6 were listed in terms of moles of the corresponding component based on 100 moles of the main component. Also, as ITO added in each example embodiment, indium tin oxide including In: 74 wt %, O: 18 wt %, and Sn: 8 wt % was used.

(Sample of Ceramic Electronic Component)

$BaTiO_3$ powder having an average particle size of 100 nm was used as the dielectric main component base material. Zirconia beads were used as a mixing/dispersion media, and a raw material powder including Indium-Tin-Oxide (ITO, In: 74 wt %, O: 18 wt % Sn: 8 wt %) and subcomponents corresponding to the compositions specified in Tables 1 to 6 below and the main component $BaTiO_3$ powder were mixed with ethanol/toluene solvent and dispersing agent, was milled for hours, binder was added, and additional milling was performed for 10 hours. The prepared slurry was used to prepare a ceramic green sheet for a cover and capacitance forming portion with a thickness of 5.0 μm using a sheet forming device. An Ni internal electrode was printed on the ceramic green sheet for the capacitance forming portion. The upper and lower covers were manufactured by laminating a 25-layer ceramic green sheet for cover, and a bar was manufactured by laminating while pressing a 20-layer printed ceramic green sheet for a capacitance forming portion. The bar was cut into a laminate having a size of 3.2 mm and 1.6 mm using a cutting device. The finished laminate was calcined, was fired in a reducing atmosphere of 0.1% $H_2/99.9\%$ $N_2$-0.5% $H_2/99.5\%$ $N_2$ ($H_2O/H_2/N_2$ atmosphere) at a temperature of 1150-1200° C. for a holding time of 2 hours, and was re-oxidized at 1040° C. in a $N_2$ atmosphere for 3 hours, thereby forming the body 110. Here, the 0.1% hydrogen concentration corresponded to the electromotive force of 680 mV and the 0.5% hydrogen concentration corresponded to the condition of the electromotive force of 760 mV in the oxygen partial pressure meter. For the fired body 110, a termination process and electrode firing were performed on Cu paste, thereby manufacturing the external electrodes 131 and 132. Accordingly, after firing, a sample of a ceramic electronic component with a size of 3.2 mm×1.6 mm with a dielectric thickness of approximately 2.2 μm or less and the number of dielectric layers of 20 layers was manufactured.

Also, in each example embodiment, the firing atmosphere varied according to the hydrogen concentration, and the EMF value in each firing atmosphere was a value measured at a sensor temperature of 850° C. using a thermoelectric type hydrogen sensor.

As for whether ITO was detected, as a result of line profile analysis by STEM-EDS of the regions (first region and second region) adjacent to the internal electrodes 121 and 122 in the dielectric layer 111 of the ceramic electronic component in the second direction, in the entire region of dielectric layer 111, the sample in which the sum of the content of In based on overall elements excluding oxygen and the content of Sn based on overall elements excluding oxygen exceeded 0.5 at % was marked as ○, and the samples in which the sum of the content was below 0.5 at % were marked as X.

As for room-temperature permittivity, capacitance of a sample was measured under 1 kHz, AC 0.5V/μm conditions using an LCR meter, the relative permittivity of the dielectric layer was measured from the thickness of the dielectric layer, the area of the internal electrode, and the number of laminations, and the results were listed, and a value of 2500 or more was determined as target properties.

Dissipation factor (DF) values were also measured using an LCR meter under 1 kHz, AC 0.5V/μm conditions, and values of 10% or less were determined as target properties.

The change in capacitance with temperature (TCC) was measured by applying 0.1 Vrms in the temperature range of −55° C. to 125° C., and the sample in which the change in capacitance in the temperature range of −55° C. to 125° C. was −22% or more and 22% or less (hereinafter referred to as "X7S properties") were determined as target properties.

As for the high-temperature IR value, the average value was taken by measuring the insulation resistance (IR) value after charging for 60 seconds by applying a DC 10V/μm voltage at a temperature of 150° C. for 10 samples, and values of $1.0E+07\Omega$ or more were determined as target properties.

The MTTF (Mean Time To Failure) value was calculated by applying a voltage corresponding to an electric field of 40 V/μm at 150° C. to 40 samples, measuring the time for failure to occur, and calculating an average time, and values of 200 hours or more were determined as target properties.

Embodiment 1

Test Nos. 1-1 to 1-4, 2-1 to 2-4, and 3-1 to 3-4 in Table 1 are various experimental conditions prepared by varying the firing atmosphere and the content of ITO added to the dielectric composition.

Properties of the samples of the ceramic electronic components manufactured according to each test No. in Table 1 are listed in Table 2.

TABLE 1

| | Experimental conditions | | | | | | | |
|---|---|---|---|---|---|---|---|---|
| | Firing atmosphere | ITO | First subcomponent | | Second subcomponent | Third subcomponent | | Fourth subcomponent |
| Test No. | EMF (mV) | content | $MnO_2$ | $V_2O_5$ | $MgCO_3$ | $Dy_2O_3$ | $Tb_4O_7$ | $SiO_2$ |
| 1-1 | 745 | 0 | 0.2 | 0.1 | 0.6 | 0.5 | 0.1 | 1.65 |
| 1-2 | 745 | 0.5 | | | | | | |
| 1-3 | 745 | 1 | | | | | | |
| 1-4 | 745 | 1.5 | | | | | | |
| 2-1 | 715 | 0 | | | | | | |
| 2-2 | 715 | 0.5 | | | | | | |
| 2-3 | 715 | 1 | | | | | | |
| 2-4 | 715 | 1.5 | | | | | | |
| 3-1 | 685 | 0 | | | | | | |
| 3-2 | 685 | 0.5 | | | | | | |
| 3-3 | 685 | 1 | | | | | | |
| 3-4 | 685 | 1.5 | | | | | | |

TABLE 2

| | | | | Sample properties | | | | |
|---|---|---|---|---|---|---|---|---|
| Test No. | Whether ITO detected | Room-temperature permittivity | DF | X7S TCC (%) @-55° C. | X7S TCC (%) @125° C. | High-temperature IR(Ω) | MTTF (hrs) | Target properties assured |
| 1-1 | X | 2749 | 5.9 | −20.7 | −14.7 | 1.70.E+07 | 176 | X |
| 1-2 | ○ | 2800 | 5.4 | −21 | −14.7 | 1.92.E+07 | 243 | ○ |
| 1-3 | ○ | 2817 | 5.4 | −21.7 | −15.3 | 1.80.E+07 | 232 | ○ |
| 1-4 | ○ | 2971 | 5.4 | −24.6 | −15.3 | 2.02.E+07 | 196 | X |
| 2-1 | X | 2755 | 6 | −21.1 | −18.9 | 1.44.E+07 | 118 | X |
| 2-2 | ○ | 2789 | 5.8 | −21.3 | −17.7 | 1.39.E+07 | 147 | X |
| 2-3 | ○ | 2817 | 5.7 | −20.9 | −17.1 | 1.64.E+07 | 136 | X |
| 2-4 | ○ | 2771 | 5.7 | −23.8 | −13.6 | 3.10.E+07 | 131 | X |
| 3-1 | X | 2948 | 6.2 | −20.8 | −24.6 | 1.39.E+07 | 67 | X |
| 3-2 | ○ | 2856 | 5.8 | −21.7 | −22.8 | 1.68.E+07 | 55 | X |
| 3-3 | ○ | 2811 | 5.8 | −20.8 | −22.1 | 1.55.E+06 | 63 | X |
| 3-4 | ○ | 2795 | 5.7 | −21.2 | −21.6 | 1.21.E+06 | 45 | X |

Referring to Tables 1 and 2, test Nos. 1-4, 2-4, and 3-1 to 3-3 had permittivity of 2500 or more and DF values of 10% or less, but do not satisfy the X7S properties due to non-uniform grain growth.

In test Nos. 2-1 to 2-4 and 3-1 to 3-4, the MTTF value was lower than 200 hours.

In test Nos. 1-2 and 1-3, it is indicated that the MTTF value was more than 200 hours, permittivity was more than 2500, the high-temperature IR value is more than 1.0E+0.7Ω, and all X7R properties was satisfied. In test Nos. 1-2 and 2-3, the amount of ITO added was 0.5 and 1.0 mol based on 100 mol of the main component in the firing atmosphere EMF 730-760 mV (hydrogen concentration up to 0.4%), and an average content of In based on overall elements excluding oxygen in the first region R1 to 50 nm in the inward direction of the dielectric layer 111 from the interfacial surface between dielectric layer 111 and internal electrodes 121 and 122 after manufacturing the sample was 0.5 at % or more and less than 2.0 at %, and an average content of Sn based on overall elements excluding oxygen was 0.5 at % or more and 1.75 at % or less.

In test No. 1-4, when the ITO content was increased to 1.5 moles based on 100 moles of the main component, the average content of In based on overall elements excluding oxygen and the average content of Sn based on overall elements excluding oxygen in the first region R1 after manufacturing the sample were detected to be greater than 2 at %, and the MTTF value decreased to less than 200 hours and did not satisfy the X7S properties.

In test Nos. 2-2, 2-3, 2-4, 3-2, 3-3, and 3-4, in the entire region of dielectric layer 111, the sum of the content of In based on overall elements excluding oxygen and the content of Sn based on overall elements excluding oxygen was detected to be greater than 0.5 at %, and permittivity of 2500 and 10% or less of DF were satisfied, but test Nos. 2-4, 3-2, and 3-3 did not satisfy the X7S properties. Test Nos. 2-2, 2-3, 2-4, 3-2, 3-3, and 3-4 did not have an MTTF of more than 200 hours.

In test Nos. 2-4, 3-2, and 3-3, as a result of analyzing the dielectric layer of the sample, it seems that the X7S properties were not satisfied due to the non-uniform grain growth of the dielectric layer, and in test Nos. 2-2, 2-3, 2-4, 3-2, 3-3, and 3-4, as a result of analyzing the dielectric layer of the sample, In and Sn were not intensively distributed in the first region of the dielectric layer, and were distributed in the entire region of the dielectric layer, such that the conditions in which the average content of In based on overall elements excluding oxygen is to be 0.5 at % or more and 2.0 at % or less, and the average content of Sn based on overall elements excluding oxygen is to be 0.5 at % or more and 1.75 were not satisfied.

In test Nos. 1-2 and 1-3 satisfying overall target properties, an average content of In based on overall elements excluding oxygen in the first region R1 up to 50 nm in the inward direction of dielectric layer 111 from the interfacial surface between dielectric layer 111 and internal electrodes 121 and 122 was 0.5 at % or more and 2.0 at % or less, and the average content of Sn based on overall elements excluding oxygen was 0.5 at % or more and 1.75 at % or less. That is, to satisfy the entirety of the MTTF value of 200 hours or more, permittivity of 2500 or more, high temperature IR value of 1.0E+0.7Ω or more, and the X7R properties, an average content of In based on overall elements excluding oxygen in the first region R1 up to 50 nm in the inward direction of dielectric layer 111 from the interfacial surface between dielectric layer 111 and internal electrodes 121 and 122 may be 0.5 at % or more and 2.0 at % or less, and the average content of Sn based on overall elements excluding oxygen may be 0.5 at % or more and 1.75 at % or less preferably.

The firing atmosphere may be in the EMF (sensor temperature 850° C.) 730-760 mV (hydrogen concentration 0.2-0.4 vol %) section, and the content of ITO added to the dielectric composition may be 0.5 mol or more and 1.0 mol or less based on 100 moles of the main component.

Embodiment 2

Test Nos. 4-1 to 4-3, 5-1 to 5-3, 6-1 to 6-4, and 7-1 to 7-4 in Table 3 list various experimental conditions with different content of the first subcomponent or the second subcomponent included in the dielectric composition.

Properties of the samples of ceramic electronic component manufactured according to each test No. in Table 3 are listed in Table 4.

TABLE 3

| | Experimental conditions | | | | | | |
|---|---|---|---|---|---|---|---|
| Test No. | Firing atmosphere EMF (mV) | ITO content | First subcomponent | | Second subcomponent | Third subcomponent | | Fourth subcomponent |
| | | | $MnO_2$ | $V_2O_5$ | $MgCO_3$ | $Dy_2O_3$ | $Tb_4O_7$ | $SiO_2$ |
| 4-1 | 730~760 | 0.5 | 0 | 0.3 | 0.6 | 0.5 | 0.1 | 1.65 |
| 4-2 | | | 0.1 | 0.2 | | | | |
| 4-3 | | | 0.3 | 0 | | | | |
| 5-1 | | 1 | 0 | 0.3 | | | | |
| 5-2 | | | 0.1 | 0.2 | | | | |
| 5-3 | | | 0.3 | 0 | | | | |
| 6-1 | 730~760 | 0.5 | 0.2 | 0.1 | 0 | 0.5 | 0.1 | 1.65 |
| 6-2 | | | | | 0.3 | | | |
| 6-3 | | | | | 0.9 | | | |
| 6-4 | | | | | 1.2 | | | |
| 7-1 | | 1 | | | 0 | | | |
| 7-2 | | | | | 0.3 | | | |
| 7-3 | | | | | 0.9 | | | |
| 7-4 | | | | | 1.2 | | | |

TABLE 4

| | Sample properties | | | | | | | |
|---|---|---|---|---|---|---|---|---|
| Test No. | Whether ITO detected | Room-temperature permittivity | DF | X7S TCC (%) | | High-temperature IR(Ω) | MTTF (hrs) | Target properties assured |
| | | | | @-55° C. | @125° C. | | | |
| 4-1 | ○ | 2334 | 5.1 | −20.3 | −13.7 | 1.92.E+07 | 211 | X |
| 4-2 | ○ | 2514 | 5.3 | −21.7 | −15.3 | 1.80.E+07 | 257 | ○ |
| 4-3 | ○ | 2867 | 6.3 | −21.2 | −23.7 | 1.79.E+05 | 187 | X |
| 5-1 | ○ | 2248 | 5 | −21.3 | −13.1 | 1.79.E+07 | 197 | X |
| 5-2 | ○ | 2507 | 5.3 | −21.9 | −14.8 | 1.51.E+07 | 248 | ○ |
| 5-3 | ○ | 2724 | 6.2 | −21.8 | −23.1 | 1.50.E+07 | 168 | X |
| 6-1 | ○ | 3378 | 6.8 | −24.9 | −23.4 | 8.96.E+06 | 175 | X |
| 6-2 | ○ | 2936 | 5.8 | −21.3 | −18.8 | 1.63.E+07 | 237 | ○ |
| 6-3 | ○ | 2689 | 5.4 | −21 | −16.7 | 4.32.E+07 | 248 | ○ |
| 6-4 | ○ | 2487 | 5.3 | −24.3 | −19.7 | 1.32.E+08 | 197 | X |
| 7-1 | ○ | 3348 | 6.8 | −24 | −22.6 | 5.88.E+06 | 167 | X |
| 7-2 | ○ | 3914 | 5.8 | −21.1 | −16.7 | 1.13.E+07 | 224 | ○ |
| 7-3 | ○ | 2711 | 5.4 | −20.5 | −15.8 | 3.92.E+07 | 238 | ○ |
| 7-4 | ○ | 2498 | 5.3 | −23.2 | −19 | 2.12.E+08 | 184 | X |

Referring to Tables 3 and 4, in test Nos. 4-1 and 5-1 are the example in which the content of $MnO_2$, the first subcomponent, was 0 mol based on 100 mol of the main component, and the content of $V_2O_5$ was 0.3 mol based on 100 mol of the main component, and it was confirmed that the room-temperature permittivity was less than 2500.

In test Nos. 4-3 and 5-3 are examples in which the content of $MnO_2$ was 0.3 mol based on 100 mol of the main component and the content of $V_2O_5$ was 0 mol based on 100 mol of the main component, and it was confirmed that the X7S properties were not satisfied and the MTTF was less than 200 hours.

Accordingly, the content of the first subcomponent included in the dielectric composition may be preferably 0.1 mol or more and 0.3 mol or less based on 100 mol of the main component, and in the dielectric layer 111 of the ceramic electronic component 100, the first subcomponent element may be included in more than 0 at % and less than 0.6 at % preferably.

Referring to test Nos. 6-1 to 6-4 and 7-1 to 7-4, it may be confirmed that when $MgCO_3$ was included as a second subcomponent in the dielectric composition, TCC properties were improved and high-temperature IR was increased.

However, in test Nos. 6-4 and 7-4 in which the content of $MgCO_3$ was 1.2 moles based on 100 moles of the main component, room-temperature permittivity was lowered to less than 2500 due to excessive grain growth suppression, and the X7S properties were not satisfied.

Accordingly, the content of the second subcomponent included in the dielectric composition may be preferably 0.3 mol or more and 0.9 mol or less based on 100 mol of the main component, and the content of the second subcomponent element based on overall elements excluding oxygen in the dielectric layer 111 of the ceramic electronic component 100 may be preferably 0.3 at % or more and 0.6 at % or less.

Embodiment 3

Test Nos. 8-1 to 8-4, 9-1 to 9-4, 10-1 to 10-3, and 11-1 to 11-3 in Table 5 list various experimental conditions with different contents of the third subcomponent or the fourth subcomponent included in the dielectric composition.

Properties of the samples of the ceramic electronic component manufactured according to each test No. in Table are listed in Table 6.

TABLE 5

| | Experimental conditions | | | | | | | |
|---|---|---|---|---|---|---|---|---|
| Test | Firing atmosphere | ITO | First subcomponent | | Second subcomponent | Third subcomponent | | Fourth subcomponent |
| No. | EMF (mV) | content | MnO$_2$ | V$_2$O$_5$ | MgCO$_3$ | Dy$_2$O$_3$ | Tb$_4$O$_7$ | SiO$_2$ |
| 8-1 | 730~760 | 0.5 | 0.2 | 0.1 | 0.6 | 0 | 0.6 | 1.65 |
| 8-2 | | | | | | 0.2 | 0.4 | |
| 8-3 | | | | | | 0.4 | 0.2 | |
| 8-4 | | | | | | 0.6 | 0 | |
| 9-1 | | 1 | | | | 0 | 0.6 | |
| 9-2 | | | | | | 0.2 | 0.4 | |
| 9-3 | | | | | | 0.4 | 0.2 | |
| 9-4 | | | | | | 0.6 | 0 | |
| 10-1 | 730~760 | 0.5 | 0.2 | 0.1 | 0.6 | 0.5 | 0.1 | 0.65 |
| 10-2 | | | | | | | | 1.15 |
| 10-3 | | | | | | | | 2.15 |
| 11-1 | | 1 | | | | | | 0.65 |
| 11-2 | | | | | | | | 1.15 |
| 11-3 | | | | | | | | 2.15 |

TABLE 6

| | Sample properties | | | | | | | |
|---|---|---|---|---|---|---|---|---|
| Test | Whether ITO | Room-temperature | | X7S TCC (%) | | high-temperature | MTTF | Target properties |
| No. | detected | permittivity | DF | @−55° C. | @125° C. | IR (Ω) | (hrs) | assured |
| 8-1 | ○ | 3107 | 6.4 | −22.8 | −17.1 | 8.93.E+06 | 194 | X |
| 8-2 | ○ | 2876 | 5.8 | −21.4 | −16.6 | 1.52.E+07 | 224 | ○ |
| 8-3 | ○ | 2677 | 5.4 | −20.7 | −15.9 | 2.84.E+07 | 239 | ○ |
| 8-4 | ○ | 2468 | 5.3 | −20.9 | −15.1 | 3.15.E+07 | 217 | X |
| 9-1 | ○ | 3087 | 6.3 | −21.4 | −16.7 | 9.13.E+06 | 181 | X |
| 9-2 | ○ | 2744 | 5.7 | −21.4 | 16.1 | 1.43.E+07 | 224 | ○ |
| 9-3 | ○ | 2616 | 5.4 | −20.1 | −15.4 | 2.17.E+07 | 219 | ○ |
| 9-4 | ○ | 2397 | 5.3 | −20.1 | −15.2 | 2.76.E+07 | 204 | X |
| 10-1 | ○ | 3317 | 6.7 | −23.7 | −16.8 | 9.42.E+06 | 176 | X |
| 10-2 | ○ | 3107 | 6.2 | −22 | −16.1 | 1.07.E+07 | 201 | ○ |
| 10-3 | ○ | 2434 | 5.3 | −21.4 | −12.4 | 9.98.E+07 | 194 | X |
| 11-1 | ○ | 3247 | 6.6 | −22.8 | −16.4 | 8.88.E+06 | 167 | X |
| 11-2 | ○ | 3087 | 6.3 | −21.7 | −15.8 | 1.78.E+07 | 214 | ○ |
| 11-3 | ○ | 2374 | 5.3 | −21.1 | −13.1 | 1.28.E+08 | 185 | X |

In Table 5 and Table 6, referring to test Nos. 8-1 to 8-4 and 9-1 to 9-4, it may be indicated that when a third subcomponent, a rare earth oxide including both Dy$_2$O$_3$ and Tb$_4$O$_7$, was added to the dielectric composition, the MTTF value increased and the room-temperature permittivity increased. Test Nos. 8-1 and 9-1 in which only 0.6 mol of Tb$_4$O$_7$ based on 100 mol of the main component was added, high temperature IR and MTTF values decreased. Also, in test Nos. 8-4 and 9-4, in which only 0.6 mol of Dy$_2$O$_3$ based on 100 mol of the main component were added, the room-temperature permittivity decreased.

Accordingly, the content of the third subcomponent included in the dielectric composition may be preferably 0.3 mol or more and 0.9 mol or less based on 100 mol of the main component. In particular, rather than including only one of Tb$_4$O$_7$ and Dy$_2$O$_3$ as a third subcomponent, a mixture of Tb$_4$O$_7$ and Dy$_2$O$_3$ may be mixed and included in an appropriate amount, and the content of Tb$_4$O$_7$ may be 0.1 mol or more and 0.4 mol or less based on 100 mol of the main component, and the content of Dy$_2$O$_3$ may be 0.2 mol or more and 0.5 mol or less based on 100 mol of the main component preferably. In this case, the content of the third subcomponent element may be 0.6 at % or more and 1.8 at % or less based on overall elements excluding oxygen in the ceramic electronic component 100 dielectric layer 111 preferably.

In test Nos. 10-1 to 10-3 and 11-1 to 11-3, SiO$_2$ was included as the fourth subcomponent of the dielectric composition. Test Nos. 10-1 and 11-1 are examples in which the content of SiO$_2$ was 0.65 mol based on 100 mol of the main component, and as a result of preventing the diffusion of ITO and the third subcomponent by causing excessively fast grain growth, it may be confirmed that X7S properties were not satisfied, and the MTTF was less than 200 hours.

Test Nos. 10-3 and 11-3 are examples in which the content of SiO$_2$ was 2.15 moles based on 100 moles of the main component, and it may be confirmed that the room-temperature permittivity was less than 2500 or the MTTF was less than 200 hours.

Accordingly, the content of the fourth subcomponent included in the dielectric composition may be preferably 1.0 mol or more and 2.0 mol or less based on 100 mol of the main component, and in the dielectric layer 111 of the ceramic electronic component 100, the content of the fourth subcomponent element based on overall elements excluding oxygen may be preferably 1.0 at % or more and 2.0 at % or less.

According to the aforementioned example embodiments, room-temperature permittivity of dielectric layer of ceramic electronic component may be improved.

Also, the dissipation factor (DF) of the dielectric layer of the ceramic electronic component may be reduced.

Also, the temperature coefficient of capacitance (TCC) of the ceramic electronic component may be improved Also, the high-temperature insulation resistance of the ceramic electronic component may improve.

Also, mean time to failure (MTTF) of the ceramic electronic component may be improved.

While the example embodiments have been illustrated and described above, it will be configured as apparent to those skilled in the art that modifications and variations could be made without departing from the scope of the present disclosure as defined by the appended claims.

What is claimed is:

1. A ceramic electronic component, comprising:
a body including a dielectric layer and an internal electrode disposed alternately with the dielectric layer; and
an external electrode disposed on the body,
wherein the dielectric layer includes a first region extending from an interfacial surface between the dielectric layer and the internal electrode to a thickness of 50 nm in the dielectric layer and a second region excluding the first region, and
wherein, the first region includes In and Sn, and in the first region, an average content of In based on overall elements excluding oxygen is 0.5 at % or more and 2.0 at % or less, and an average content of Sn based on the overall elements excluding oxygen is 0.5 at % or more and 1.75 at % or less.

2. The ceramic electronic component of claim 1, wherein the average content of In based on the overall elements excluding oxygen in the first region is defined as I1, an average content of In based on the overall elements excluding oxygen in the second region is defined as I2, the average content of Sn based on the overall elements excluding oxygen in the first region is defined as S1, and an average content of Sn based on the overall elements excluding oxygen in the second region is defined as S2, I1>I2 and S1>S2 are satisfied.

3. The ceramic electronic component of claim 2, wherein, in the internal electrode, an average content of In based on the overall elements excluding oxygen is defined as I3, and an average content of Sn based on overall elements excluding oxygen is defined as S3, I1>I2>I3 and S1>S2>S3 are satisfied.

4. The ceramic electronic component of claim 3, wherein I2 is 1.0 at % or less, and S2 is 1.0 at % or less.

5. The ceramic electronic component of claim 4, wherein I3 is less than 0.5 at %, and S3 is less than 0.5 at %.

6. The ceramic electronic component of claim 1, wherein, in the first region, a peak value of a content of In based on the overall elements excluding oxygen is 1.2 at % or more, and a peak value of a content of Sn based on the overall elements excluding oxygen is 1.0 at % or more.

7. The ceramic electronic component of claim 1, wherein the internal electrode includes Ni at a content of 90 at % or more based on the overall elements excluding oxygen, and the interfacial surface is a region in which a content of Ni based on the overall elements excluding oxygen begins to decrease to 90 at % or less.

8. The ceramic electronic component of claim 1, wherein an average thickness of the dielectric layer is 1.8 μm or more and 2.8 μm or less.

9. The ceramic electronic component of claim 1, wherein the dielectric layer includes Ba and Ti as main component elements.

10. The ceramic electronic component of claim 9, wherein the dielectric layer further includes a first subcomponent element including one or more of Mn, V, Cr, Fe, Ni, Co, Cu and Zn in a content greater than 0 at % and less than 0.6 at % based on the overall elements excluding oxygen.

11. The ceramic electronic component of claim 9, wherein the dielectric layer further includes Mg as a second subcomponent element, and a content of the second subcomponent element based on the overall elements excluding oxygen is 0.3 at % or more and 0.6 at % or less.

12. The ceramic electronic component of claim 9, wherein the dielectric layer further includes one or more of Y, Dy, Ho, Er, Gd, Ce, Nd, Sm, Tb, Tm, La, Gd and Yb as a third subcomponent element, and a content of the third subcomponent element based on the overall elements excluding oxygen is 0.6 at % or more and 1.8 at % or less.

13. The ceramic electronic component of claim 9, wherein the dielectric layer further includes Si as a fourth subcomponent element, and a content of the fourth subcomponent element based on the overall elements excluding oxygen is 1.0 at % or more and 2.0 at % or less.

14. The ceramic electronic component of claim 1, wherein the ceramic electronic component satisfies one or more properties of permittivity of 2500 or more, MTTF of 200 hours or more, a high-temperature IR value of $1.0E+07\Omega$ or more, and a TCC change rate of −22% or more and 22% or less in a temperature range of −55° C. to 125° C.

* * * * *

UNITED STATES PATENT AND TRADEMARK OFFICE
CERTIFICATE OF CORRECTION

| | | |
|---|---|---|
| PATENT NO. | : 12,456,583 B2 | Page 1 of 1 |
| APPLICATION NO. | : 18/242833 | |
| DATED | : October 28, 2025 | |
| INVENTOR(S) | : In Ho Jeon et al. | |

It is certified that error appears in the above-identified patent and that said Letters Patent is hereby corrected as shown below:

On the Title Page

Please insert the following foreign application data:
--(30) Foreign Application Priority Data:
Nov. 4, 2022 (KR).........................10-2022-0146266
Dec. 28, 2022 (KR).........................10-2022-0187735--

Signed and Sealed this
Twenty-third Day of December, 2025

John A. Squires
*Director of the United States Patent and Trademark Office*